(12) United States Patent
Yuan et al.

(10) Patent No.: US 10,372,553 B1
(45) Date of Patent: Aug. 6, 2019

(54) PARALLEL FILE RESTORATION FROM A SERIALIZED STORAGE DEVICE USING A NETWORK DATA MANAGEMENT PROTOCOL

(71) Applicant: EMC Corporation, Hopkinton, MA (US)

(72) Inventors: Hsing Yuan, Palo Alto, CA (US); Hymanand Nellore, Cupertino, CA (US); Ilavarasu Pandian, Sunnyvale, CA (US); Moiz Haidry, Campbell, CA (US); Abhijeet Kodgire, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 547 days.

(21) Appl. No.: 14/673,284

(22) Filed: Mar. 30, 2015

(51) Int. Cl.
*G06F 11/14* (2006.01)
*G06F 16/18* (2019.01)

(52) U.S. Cl.
CPC ...... *G06F 11/1464* (2013.01); *G06F 16/1858* (2019.01); *G06F 2201/80* (2013.01)

(58) Field of Classification Search
CPC ........... G06F 17/30224; G06F 11/1464; G06F 16/1858
See application file for complete search history.

(56) References Cited

U.S. PATENT DOCUMENTS

| | | | | |
|---|---|---|---|---|
| 5,535,381 | A * | 7/1996 | Kopper | G06F 3/0601 710/52 |
| 6,351,754 | B1 * | 2/2002 | Bridge, Jr. | G06F 11/1461 |
| 6,721,766 | B1 * | 4/2004 | Gill | G06F 11/1469 |
| 8,478,726 | B2 * | 7/2013 | Habermann | G06F 11/1464 707/640 |
| 2002/0049767 | A1 * | 4/2002 | Bennett | G06F 17/21 |
| 2014/0074790 | A1 * | 3/2014 | Berman | G06F 17/3007 707/649 |
| 2014/0310247 | A1 * | 10/2014 | Vijayan | G06F 11/1469 707/679 |

* cited by examiner

*Primary Examiner* — Cam Y T Truong
(74) *Attorney, Agent, or Firm* — Amin, Turocy & Watson, LLP

(57) ABSTRACT

Performing parallel file restoration from a serialized storage device using a network data management protocol is presented herein. A system can comprise a reader, a parser component, and a set of writers. The reader can be configured to copy data from a tape drive to memory buffers as buffered data. The parser component can be configured to determine, within the buffered data, a location of a file header record representing a file that has been stored in the tape drive, and generate, based on the file header record, a header work item for facilitating restoration of the file in a file system. Further, the set of writers can be configured to create, based on the header work item using the buffered data, the file in the file system.

15 Claims, 23 Drawing Sheets

PARALLEL FILE RESTORATION FROM A SERIALIZED STORAGE DEVICE USING A NETWORK DATA MANAGEMENT PROTOCOL

TECHNICAL FIELD

The subject disclosure generally relates to embodiments for performing parallel file restoration from a serialized storage device using a network data management protocol.

BACKGROUND

Network data storage is typically provided by an array of disk drives integrated with a large semiconductor cache memory—forming a cached disk array. A file server is used to interface the cached disk array to a network. In order to protect data on the file server, a backup procedure is performed at regular intervals, during which the data is copied from the file server to a tape drive via a Network Data Management Protocol (NDMP) service. Although restoration of data from the tape drive to the file server is performed by a restore procedure on an as needed basis, restoration performance is important in order to recover data in a reasonable timeframe, e.g., to maintain system performance, avoid business interruptions, etc.

Conventional NDMP restore technologies read data from a tape drive and restore such data in a file server in a serial manner, i.e., one file at a time. Consequently, such technologies have had some drawbacks with respect to recovering data in an efficient manner, leaving much room for improvement.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
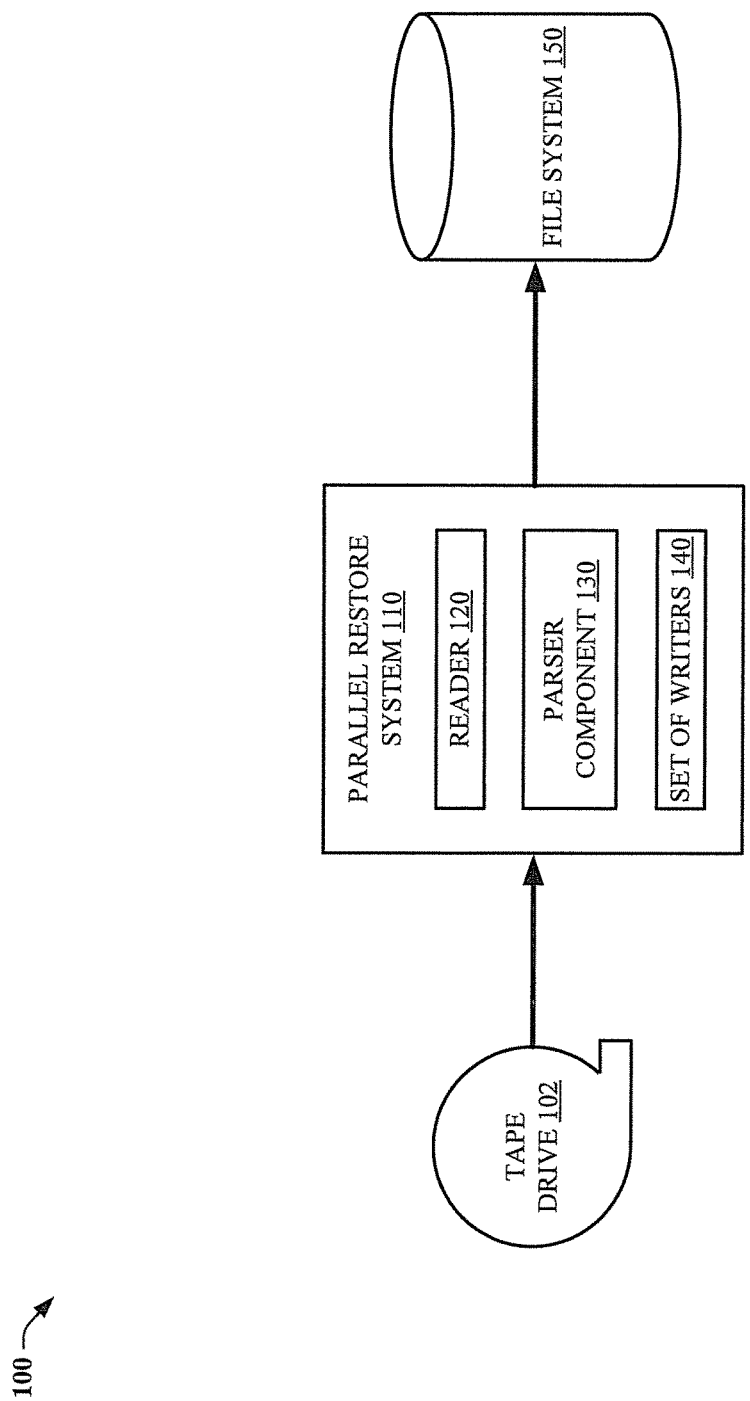
FIG. 1 illustrates a block diagram of an NDMP restore environment, in accordance with various embodiments.
Figure 2:
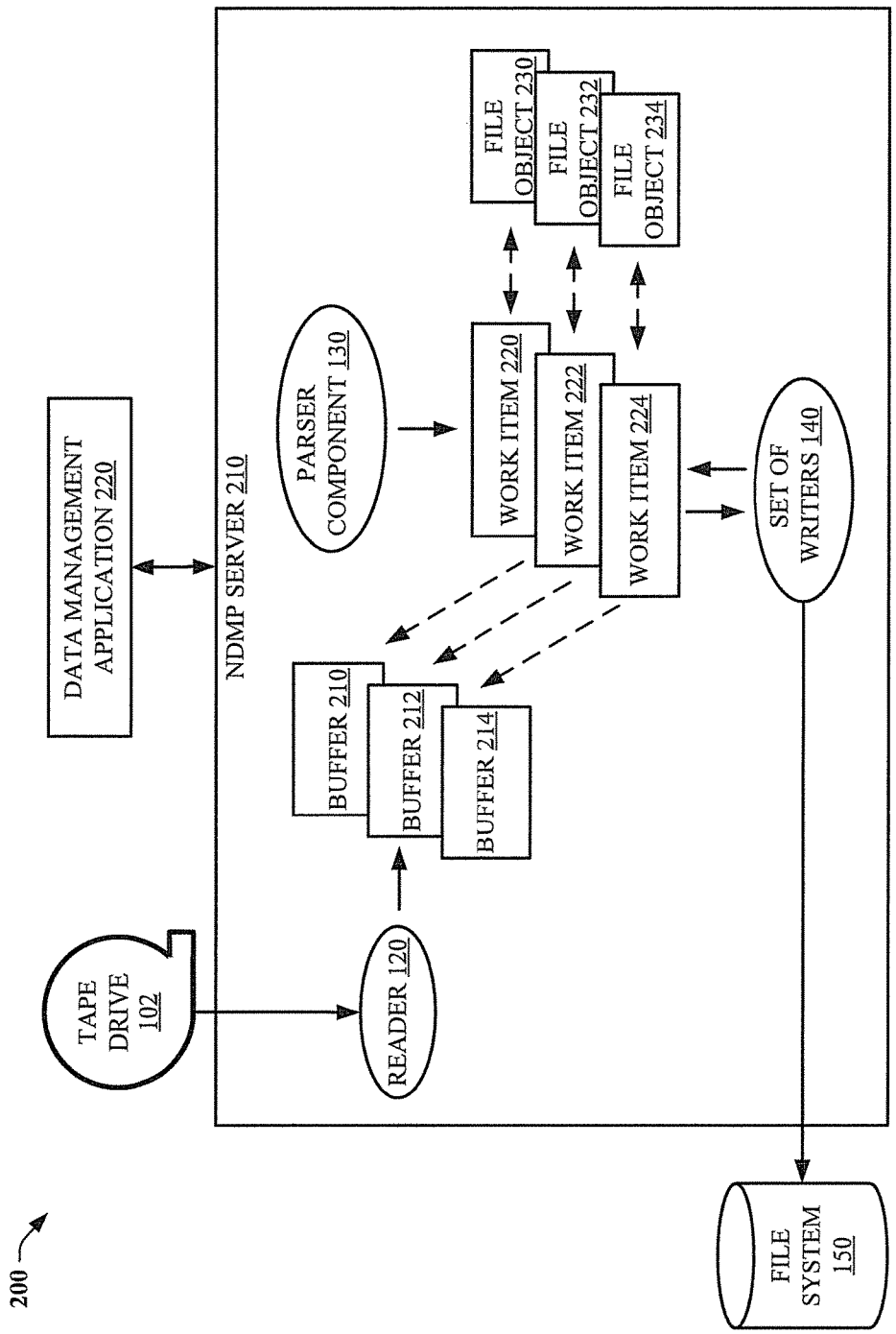
FIG. 2 illustrates another block diagram of the NDMP restore environment, in accordance with various embodiments.
Figure 3:
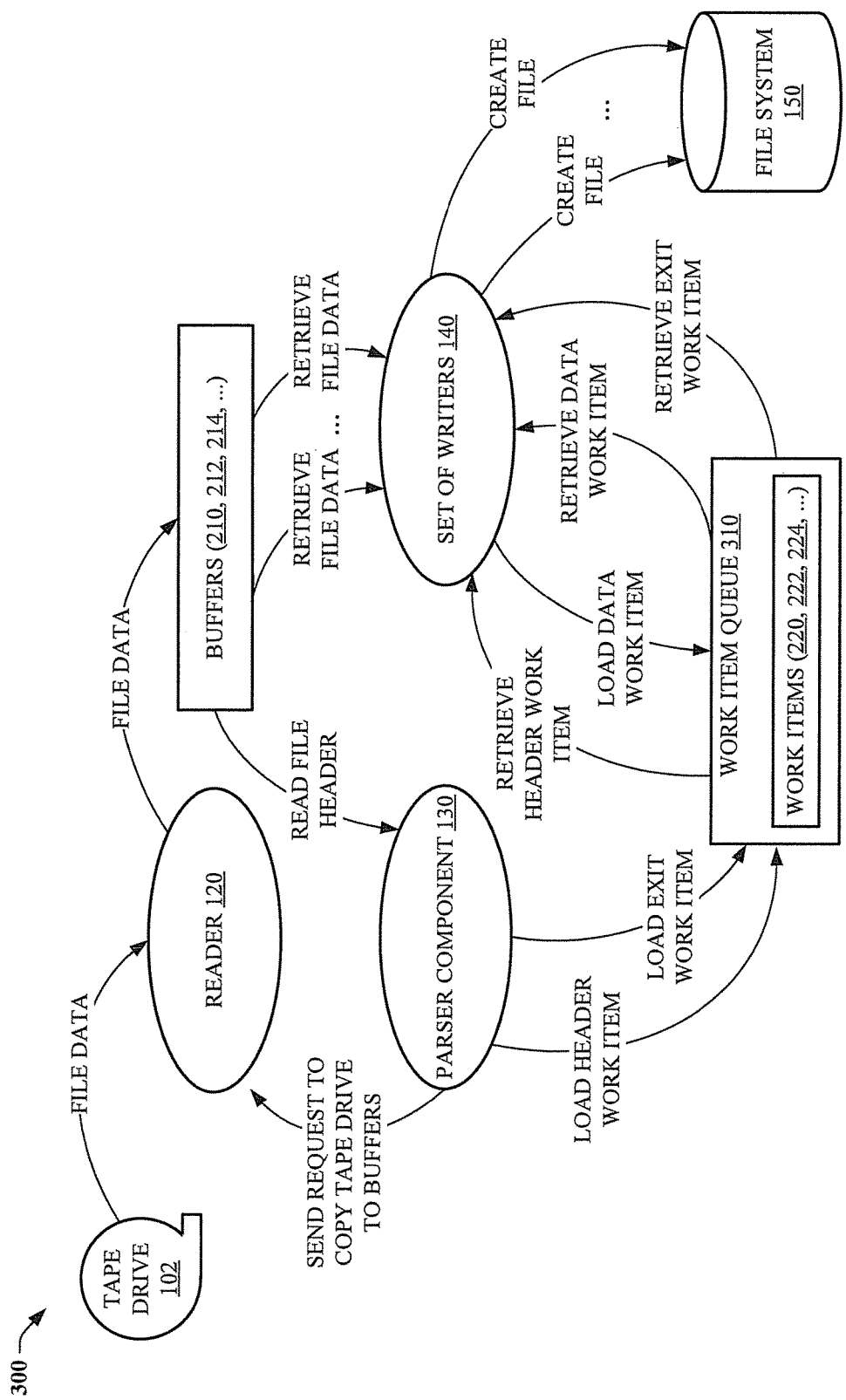
FIG. 3 illustrates a state diagram of the NDMP restore environment, in accordance with various embodiments.
Figure 4:
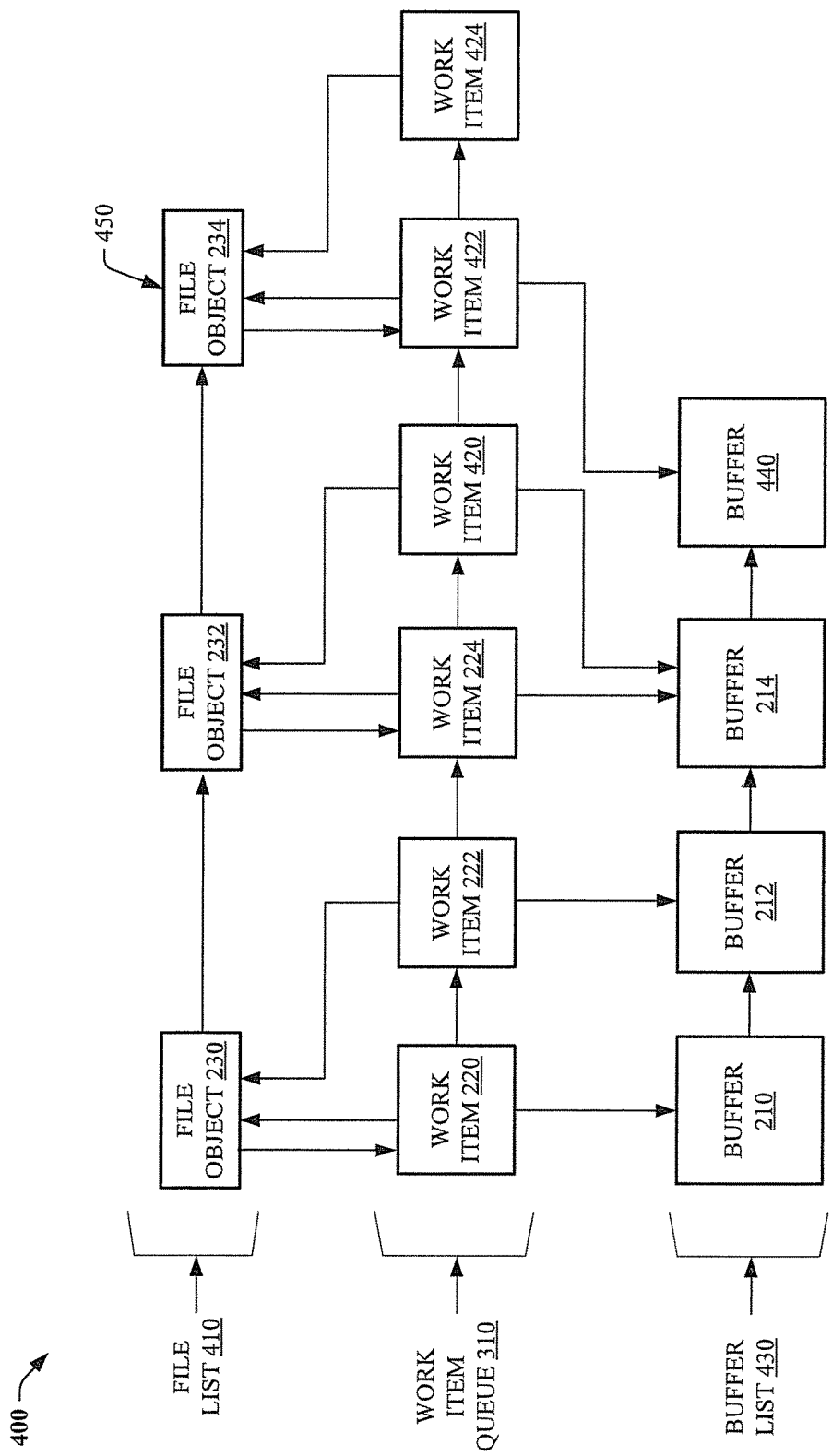
FIG. 4 illustrates a block diagram of data structures used within the NDMP restore environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As mentioned, conventional NDMP restore technologies have had some drawbacks with respect to recovering data from a tape drive during data restore of a file system. Various embodiments disclosed herein can improve performance of NDMP restore operations by leveraging system memory and multiple writing components to recover data, e.g., files, to the file system.

For example, a system, parallel restore system, etc. can comprise a reader, a parser component, and a set of writers. In this regard, the reader can be configured to copy data, e.g., in a serialized manner, from a tape drive, e.g., data storage device that reads/writes data on a magnetic tape, to memory buffers as buffered data, e.g., the memory buffers forming a linked list that has been sorted by byte offsets of files that have been stored in the tape drive. The parser component can be configured to locate, determine, etc. within the buffered data, a location of a file header, file header record, etc. representing a file that has been stored in the tape drive, and generate, based on the file header, a header work item for facilitating restoration of the file in a file system. Further, the set of writers can be configured to create, based on the header work item using the buffered data, the file in the file system.

In one embodiment, the parser component can further be configured to send a request directed to the reader to copy the data from the tape drive, e.g., in response to a determination that the file header record has not been included in the buffered data. In this regard, the reader can further be configured to receive the request from the parser component, and based on the request, copy the data from the tape drive to the memory buffers.

In an embodiment, the parser component can further be configured to place the header work item in a work item queue, and a writer of the set of writers can be configured to retrieve the header work item from the work item queue. In another embodiment, the parser component can further be configured to create, based on the file header record, a file object data structure comprising information for the facilitating of the restoration of the file in the file system. In this regard, the header work item can comprise an address pointer for locating the file object data structure within a file list, e.g., of file object data structures.

In yet another embodiment, the writer can further be configured to generate a data work item for facilitating copying file data from the buffered data to the file. Further, the writer can place the data work item in the work item queue. In one embodiment, another writer of the set of writers can be configured to retrieve the data work item from the work item queue, locate, based on the data work item using the file object data structure, the file data within the buffered data, and copy the file data from the memory buffers to the file.

In an embodiment, the parser component can further be configured to generate an exit work item in response to the file header record being determined to contain all zeros, and place the exit work item in the work item queue. In another embodiment, the writer of the set of writers can be configured to retrieve the exit work item from the work item queue, and complete, based on the exit work item, processing of the file, e.g., restoring timestamps of files.

In one embodiment, a method can comprise copying, by a system comprising a processor, e.g., in a serial manner, file data from a tape drive into memory buffers as buffered data. Further, the method can comprise creating, by the system, a header work item for facilitating restoration, in a file system, of a file that has been stored on the tape drive in response to locating, within the buffered data, a file header representing the file. Furthermore, the method can comprise creating, by the system based on the header work item using the buffered data, the file in the file system.

In an embodiment, the method can further comprise placing, by the system, the header work item in a work item queue—the creating comprising retrieving the header work item from the work item queue. In another embodiment, the method can further comprise generating, by the system based on the file header, a file object data structure comprising information for the facilitating of the restoration of the file in the file system.

In yet another embodiment, the method can further comprise creating, by the system, a data work item for facilitating copying file data from the buffered data to the file, and placing, by the system, the data work item in the work item queue. Further, the method can comprise retrieving, by the system, the data work item from the work item queue; locating, by the system based on the data work item using the file object data structure, the file data within the buffered data; and copying, by the system, the file data from the memory buffers to the file in the file system.

One embodiment can comprise a computer-readable storage device having stored thereon executable instructions that, in response to execution, cause a device comprising a processor to perform operations, the operations comprising: copying data from a tape drive to memory buffers as buffered data; determining, within the buffered data, a location of a file header record representing a file that has been stored in the tape drive; generating, using the location of the file header record, a header work item for facilitating restoration of the file in a file system; and restoring, based on the header work item using the buffered data, the file in the file system.

In another embodiment, the operations can further comprise creating a data work item for facilitating copying file data from the buffered data to the file, and placing the data work item in a work item queue. In this regard, in an embodiment, the operations can further comprise retrieving the data work item from the work item queue; locating, based on the data work item, the file data within the buffered data; and copying the file data from the buffered data to the file in the file system.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "function", "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a network device, a gateway, a wireless communication device, etc., by receiving reports from such communication equipment, by receiving operator preferences, by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by parallel restore system 110 (see below), comprising but not limited to copying data from a tape drive to memory buffers as buffered data; determining, within the buffered data, a location of a file header record representing a file that has been stored in the tape drive; generating, based on the file header record, a header work item for facilitating restoration of the file in a file system; and creating, based on the header work item using the buffered data, the file in the file system.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., parallel restore system 110 (see below), to automatically determine, within buffered data, a location of a file header record representing a file that has been stored in a tape drive. Further, the classifier(s) can be used by the artificial intelligence system to automatically create, using the buffered data based on header work items placed in a work item queue, files in a file system.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Conventional NDMP restore technologies have had some drawbacks with respect to recovering data from a tape drive during data restore of a file system. On the other hand, various embodiments disclosed herein can improve performance of NDMP restore operations by reading data from a tape drive into memory, finding boundaries of files in the memory, and utilizing multiple writing components to copy file data from the memory to restore the files in the file system.

Now referring to FIGS. 1-4, block diagrams (100 and 200) of NDMP restore environments, a state diagram of an NDMP restore environment, and a block diagram of data structures used within the NDMP restore environment are illustrated, respectively, in accordance with various embodiments. As illustrated by FIG. 1, parallel restore system 110 can include reader 120, parser component 130, and set of writers 140. In this regard, reader 120 can be configured to copy data, file data, etc., e.g., in a serialized manner, from tape drive 102 to memory buffers (e.g., 210, 212, 214, 440) as buffered data, e.g., the memory buffers forming a linked list, e.g., buffer list 430, that has been sorted by byte offsets of files that have been stored in tape drive 102. In one embodiment, a buffer, memory buffer, etc. corresponds to a buffer structure representing a starting tape offset regarding tape drive 102, an ending tape offset regarding tape drive 102, a size of the buffer, a data pointer, and a link to the next buffer. In this regard, a global structure comprising a list head, count, and mutex is monitored, utilized, etc. by reader 120.

Parser component 130 can be configured to locate, determine, read, etc. within the buffered data, a location of file headers, file header records, etc. representing such files. Further, parser component 130 can generate, based on the file headers, respective header work items (e.g., 220, 222, 224, 420, 422, 424) for facilitating restoration of the files in file system 150.

Furthermore, parser component 130 can be configured to send a request directed to reader 120 to copy the file data from tape drive 102 to the memory buffers, e.g., in response to a determination that data, file data, etc., e.g., a file header, a file header record, etc. has not been included in the buffered data. In this regard, reader 120 can further be configured to copy the data from tape drive 102 to the memory buffers in response to receiving the request from parser component 130.

In one embodiment, parser component 130 can further be configured to place, load, etc. the header work items in work item queue 310, and a writer of set of writers 140 can be configured to retrieve a header work item from work item queue 310. The header work item enables the writer of set of writers 140 to create, restore, etc. a file in file system 150 utilizing the memory buffers. In this regard, in an embodiment, parser component 130 be configured to create, based on the file header, a file object data structure (e.g., 230, 232, 234) comprising information for facilitating restoration of a file of the files in file system 150—the header work item comprising an address pointer for locating the file object data structure within a file list, file object list, etc. (e.g., 410) of file object data structures (230, 232, 234).

In another embodiment, the file object data structure can comprise information necessary to create the file and restore data of the file, e.g., such information comprising a file path, file statistics (e.g., file type, file size, file flags, etc.), starting tape offset, e.g., regarding tape drive 102, ending tape offset, e.g., regarding tape drive 102, a sparse map, etc. In an embodiment, data of a sparse file comprises the sparse map and a condensed data stream. In this regard, the sparse map defines a number of data regions, and offsets and sizes of each data region. As described below, in response to determining that a file object is a sparse file, the writer of set of writers 140 can read, process, etc. a sparse map of the sparse file, and generate a data work item for each data region defined by the sparse map. In an embodiment, a sparse map work item can direct the writer of the set of writers 140 to create the sparse map.

In yet another embodiment, the file object data structure can comprise a list, e.g., of pointers, etc. to active work items, e.g., work items that have been queued in work item queue 310. In an embodiment, file object data structures of the file list are freed, released for further processing, etc. in order. In this regard, processing of the memory buffers can be performed in order of tape offset. For example, a buffer can be freed, released for further processing, etc. in response to a determination that the buffer's ending tape offset is before, or less than, the ending tape offset of the first file object data structure in the file list.

A writer of set of writers 140 can be configured to generate a data work item for facilitating copying file data from the buffered data to the file of file system 150, and place, load, etc. the data work item in work item queue 310. In one embodiment, another writer of set of writers 310 can be configured to retrieve the data work item from work item queue 310, and locate, based on the data work item using the file object data structure, the file data within the buffered data. Further, the other writer can copy the file data from the memory buffers to the file, e.g., creating, restoring, etc. the file on file system 150.

In this regard, parallel restore system 110 can improve restore performance by independently recovering multiple files to file system 150 utilizing multiple writers of set of writers 140—such writers independently generating and/or retrieving data work items to facilitate "parallel" recovery, restoration, etc. of files on file system 150.

In an embodiment, parser component 130 can further be configured to generate an exit work item for each writer of set of writers 140, e.g., the exit work item utilized to notify the writer that parser component 130 has completed processing of a file for the writer. In this regard, parser component 130 can place the exit work items in work item queue 310, and each writer of set of writers 140 can be configured to retrieve a respective exit work item from work item queue 310 and complete processing of a respective file, e.g., restoring a timestamp of the file, etc. based on the exit work item. For example, parser component 130 can place an exit work item in work item queue 310 in response to the file header being determined to contain all zeros, e.g., representing that the end of the steam, tape stream, etc. of tape drive 102 has been reached. In one embodiment, parser component 130 can process, for a direct access restore (DAR), an nlist, e.g., an array of NDMP name structures specifying the data for which file history is to be recovered, one file at a time. For each file, parser component 130 can specify a tape position for tape drive 102 and number of bytes to for reader 120 to copy to the memory buffers. In this regard, reader 120 can utilize a data management application (DMA) (not shown) to seek to the tape position, and copy the number of bytes requested by parser component 130. In another embodiment, parser component 130 can process, restore, etc. all files in the nlist.

In an embodiment, file system 150 can comprise a parallel distributed networked file system, e.g., OneFS™ file system provided by EMC Isilon Systems. In this regard, the parallel distributed networked file system is a type of clustered file system that spreads data across multiple storage nodes, e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of a cluster.

NDMP defines a mechanism and protocol for controlling backup, recovery, and other transfers of data between primary and secondary storage. In this regard, in an embodiment illustrated by FIG. 2, an NDMP based architecture can separate a network attached DMA (DMA 220) from a server, data server, tape server, etc. (e.g., NDMP server 210) participating in archival or recovery operations. Further, the NDMP architecture provides low-level control of tape devices, e.g., tape drive 102, and NDMP services participating, e.g., via reader 120, parser component 130, and set of writers 140, etc. in such operations. In this regard, NDMP specifies the format and means of transmission of messages and payload data between DMA 220 and NDMP server 210, e.g., NDMP server 210 including one or more components, elements, etc. of parallel restore system 110. For example, parallel restore system 110 can utilize DMA 220 and NDMP server 210 to facilitate performance of operations disclosed herein, e.g., utilizing extensions of "core" NDMP server specifications—the extensions comprising groups of requests used to control server functionality that is not part of the core NDMP server specifications.

FIGS. 5-22 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
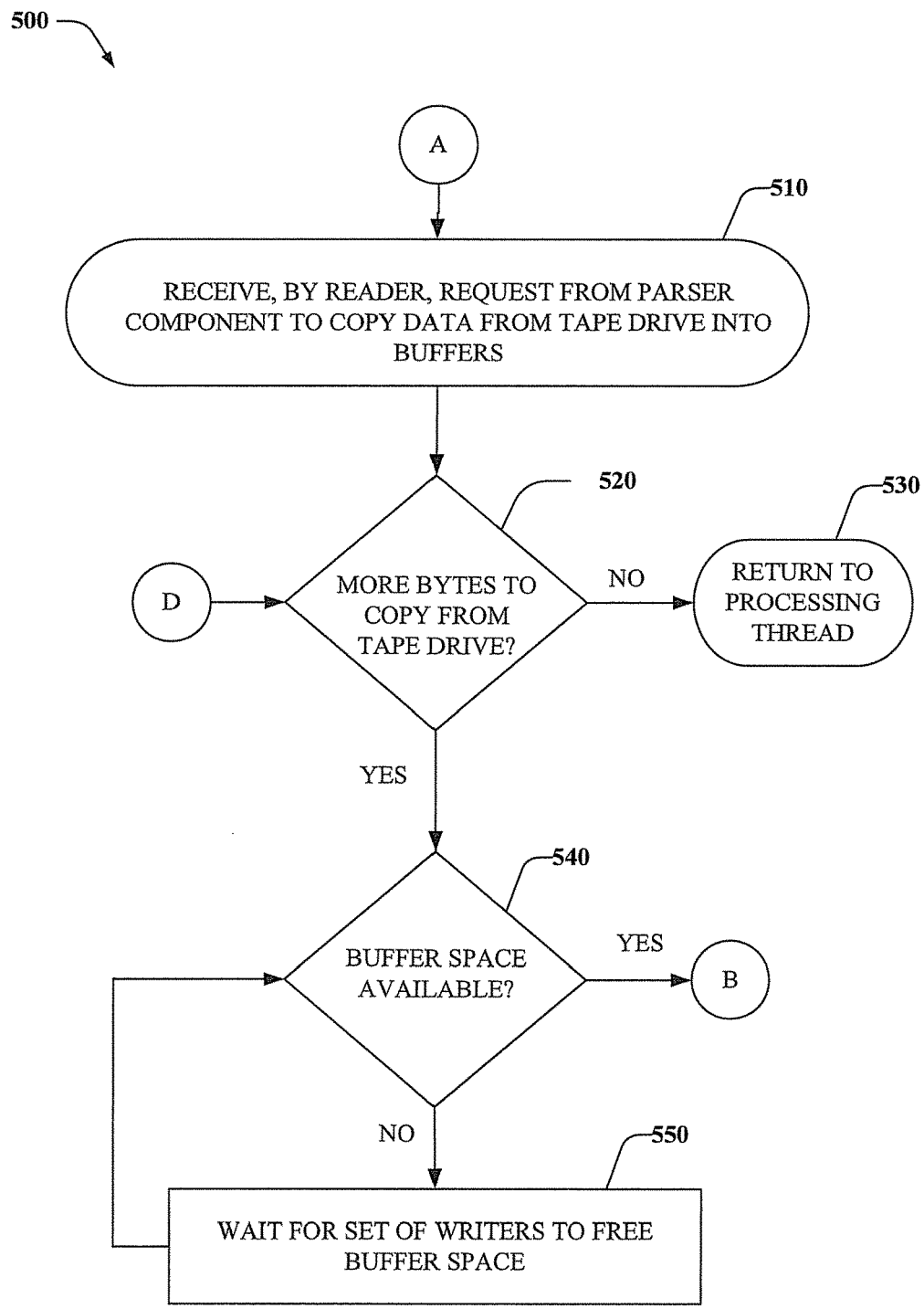
FIGS. 5-7 illustrate flowcharts of methods associated with the NDMP restore and performed by a reader, in accordance with various embodiments.
Figure 6:
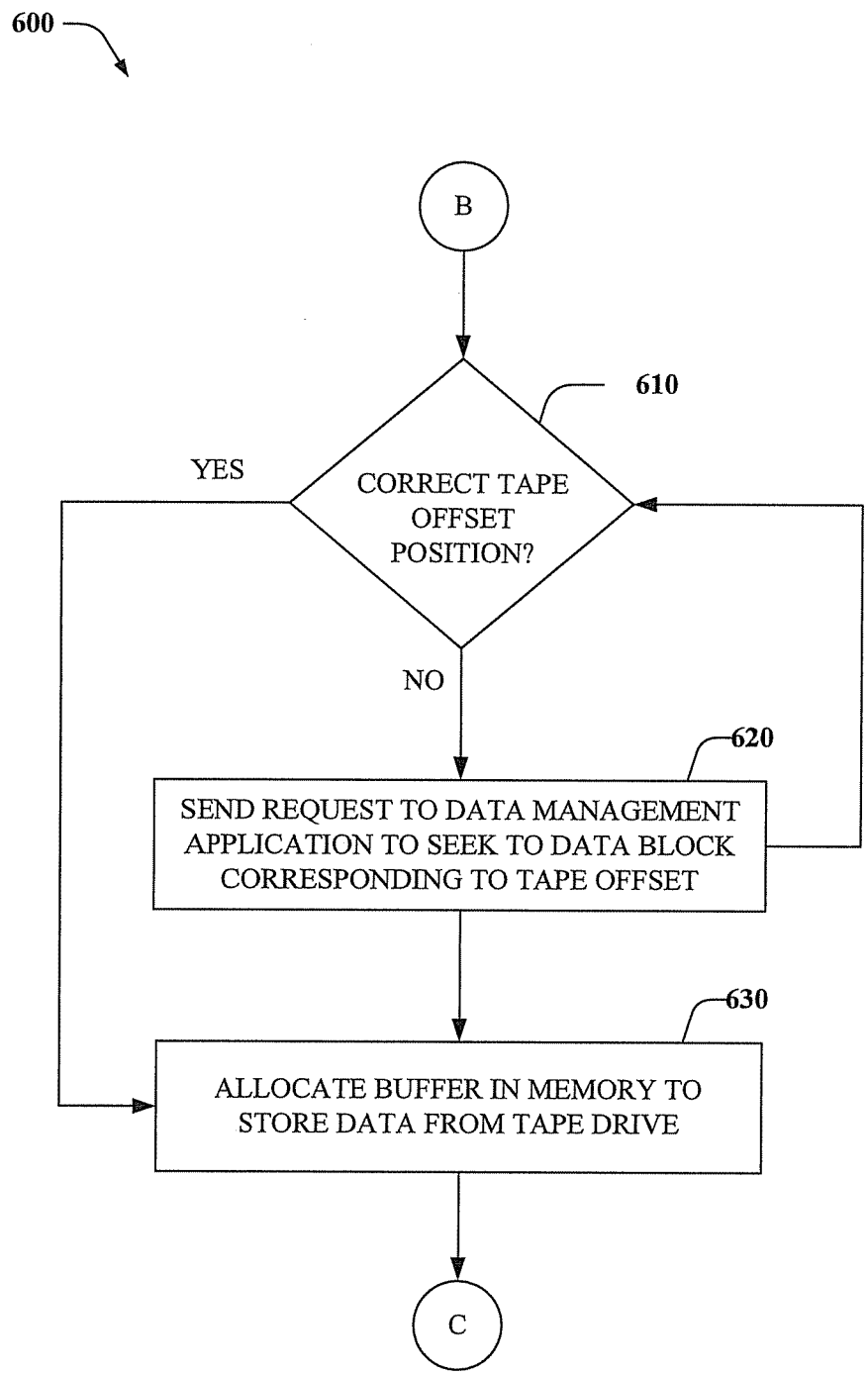
Figure 7:
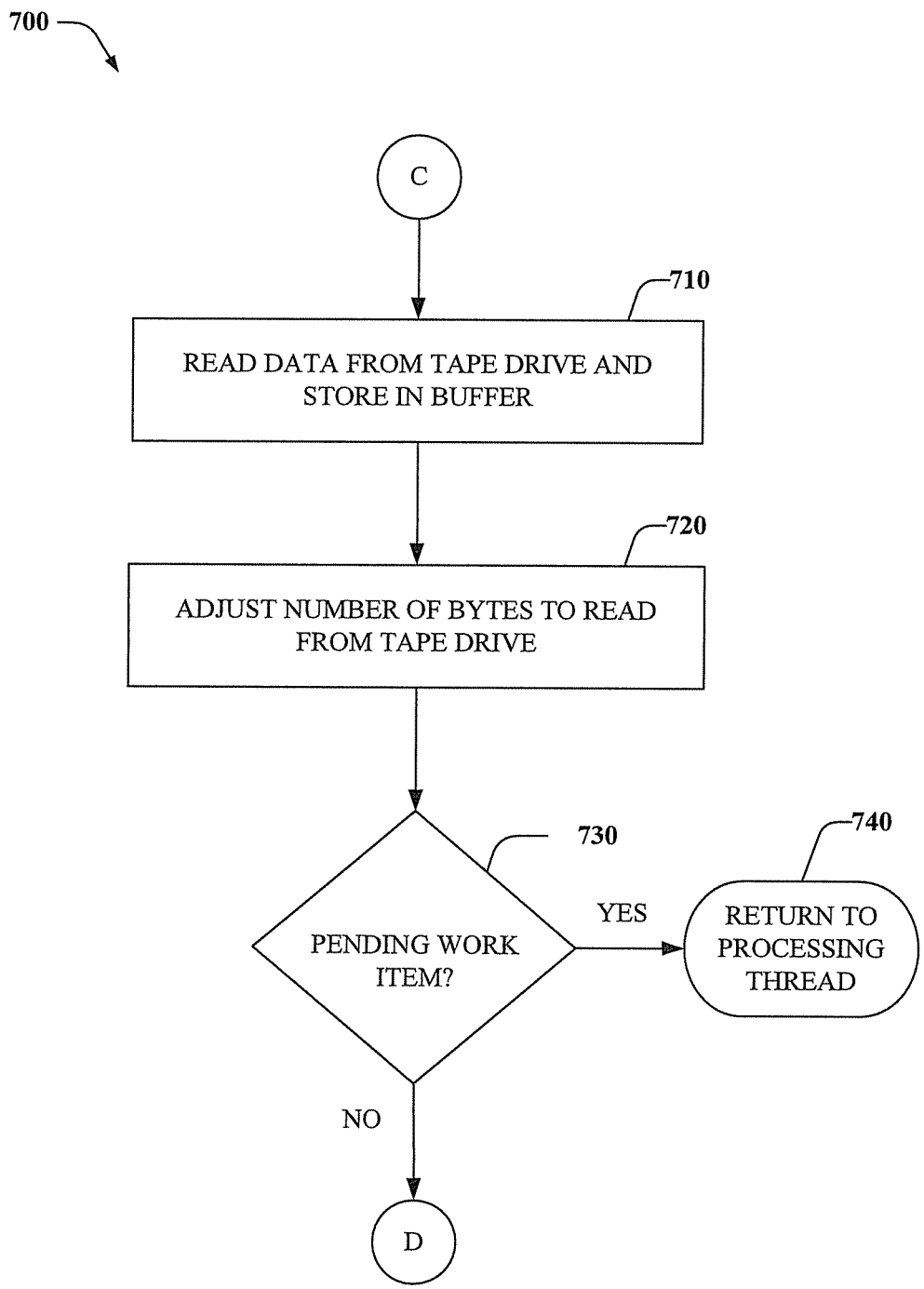
Figure 8:
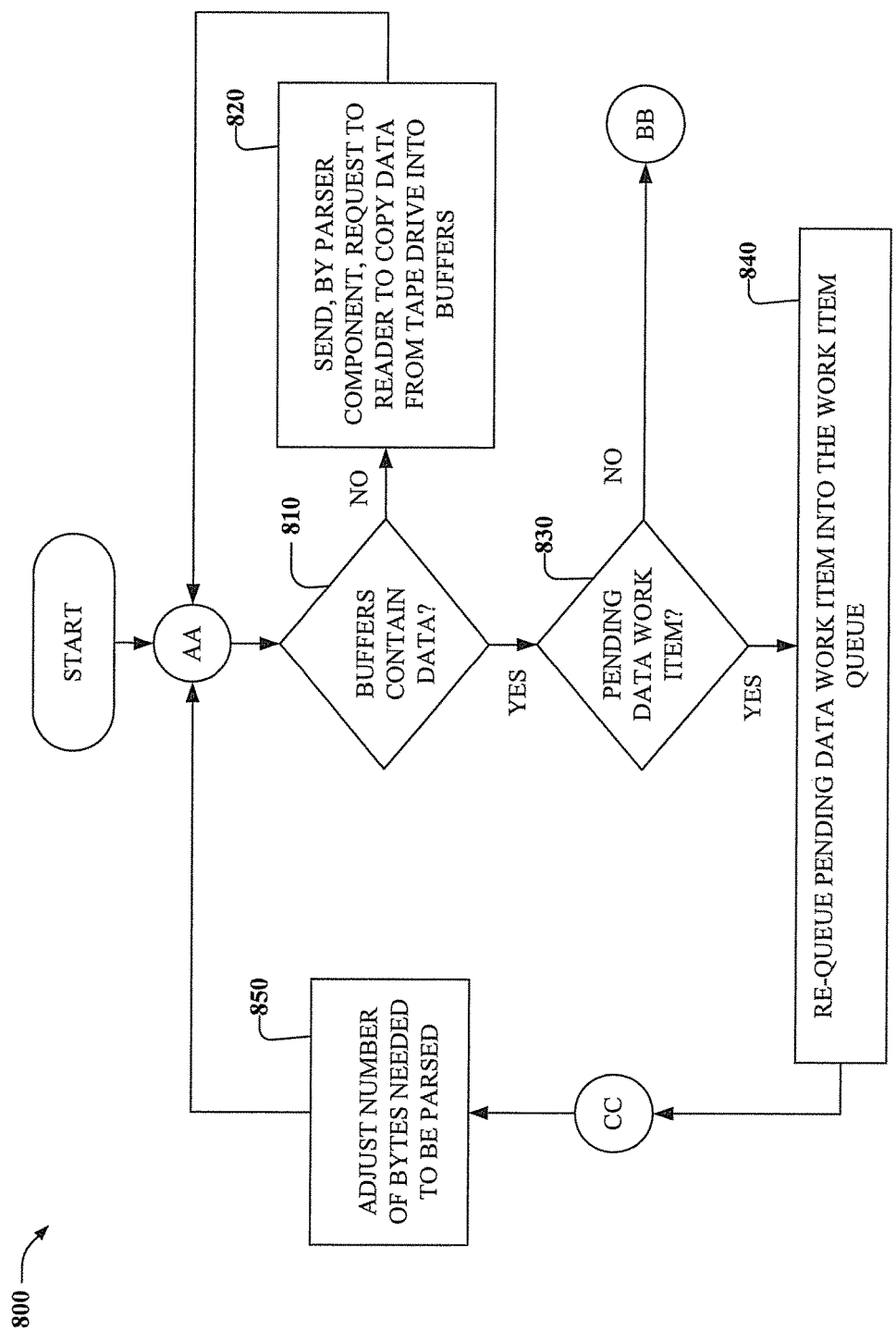
FIGS. 8-11 illustrate flow charts of methods associated with the NDMP restore and performed by a parser component, in accordance with various embodiments.
Figure 9:
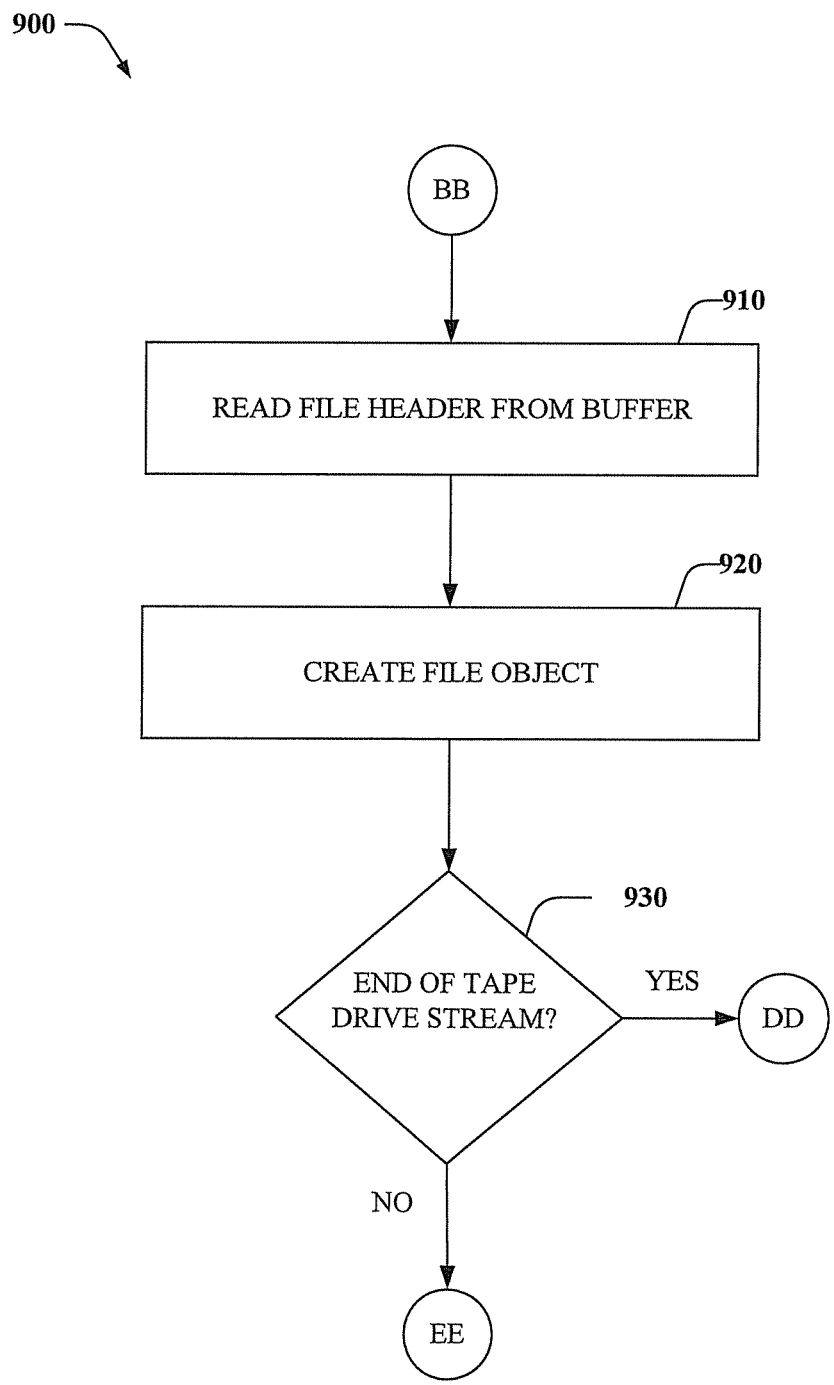
Figure 10:
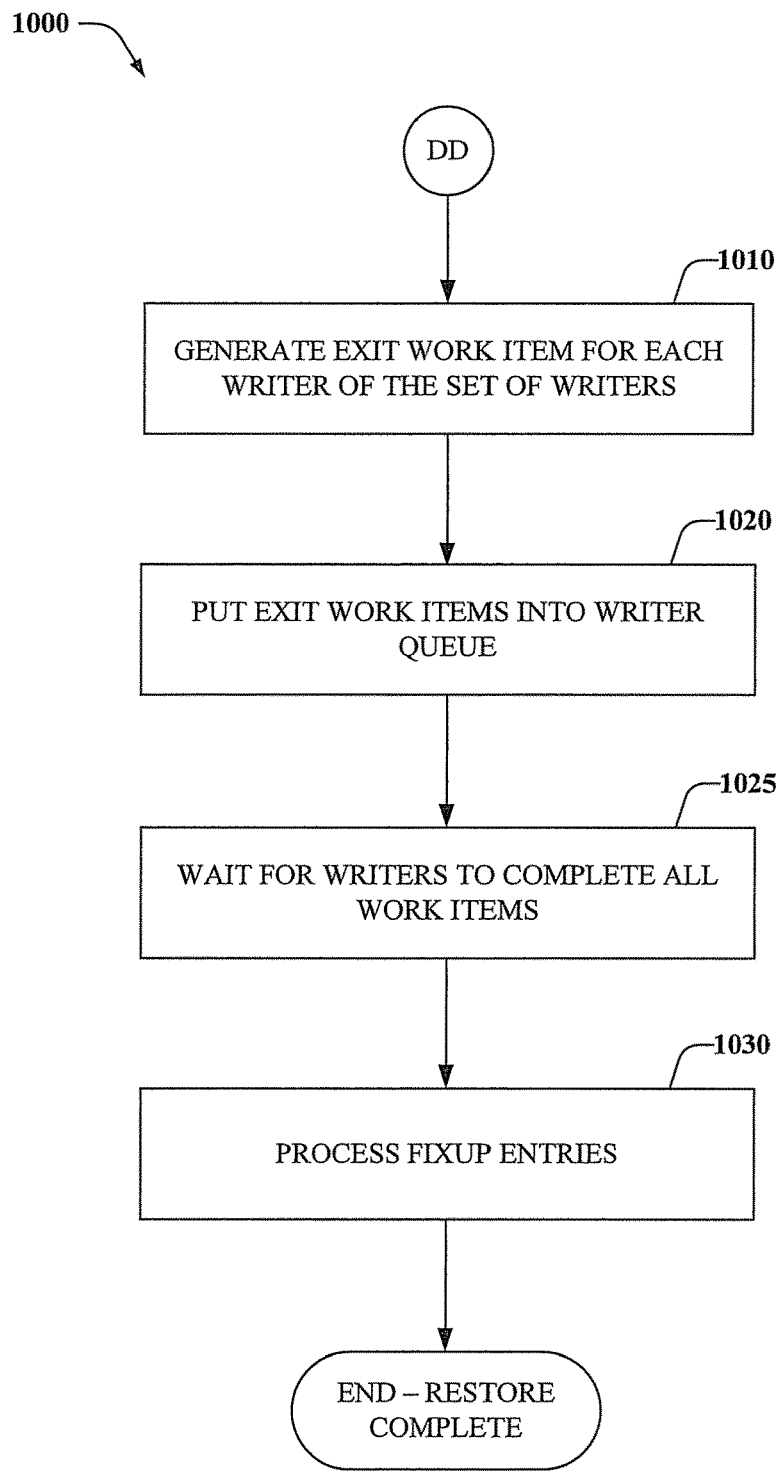
Figure 11:
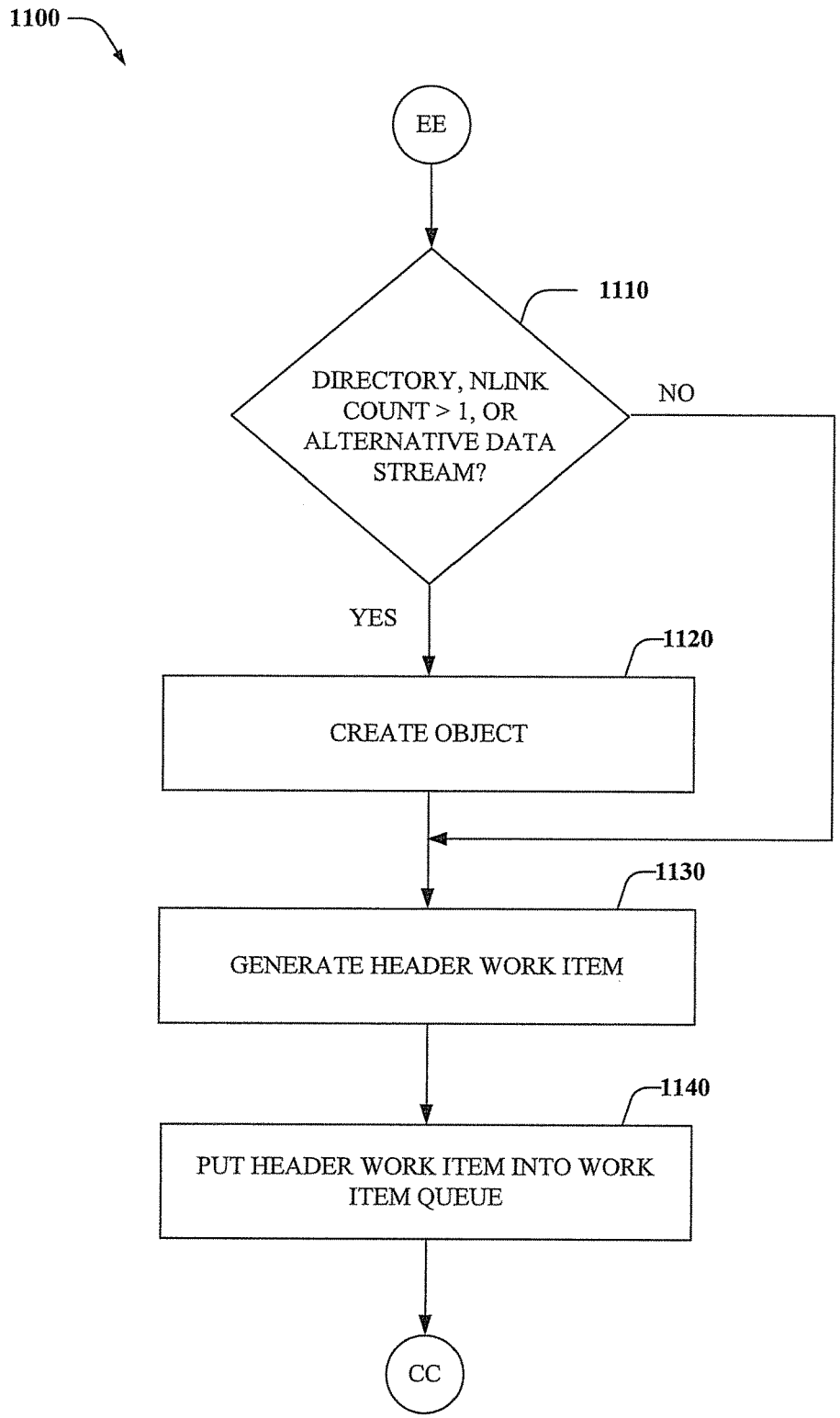
Figure 12:
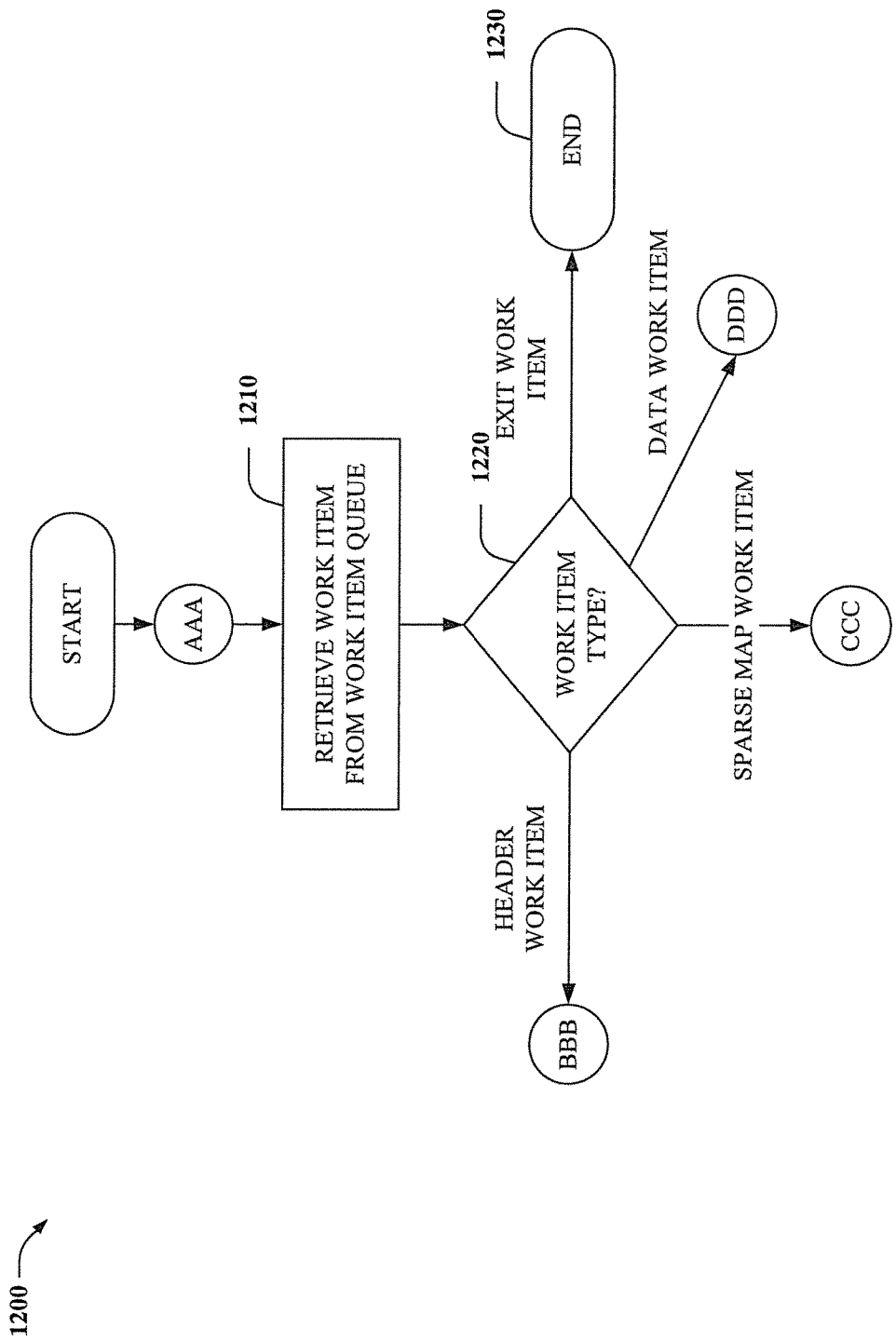
FIGS. 12-15 illustrate flow charts of methods associated with the NDMP restore and performed by a set of writers, in accordance with various embodiments.
Figure 13:
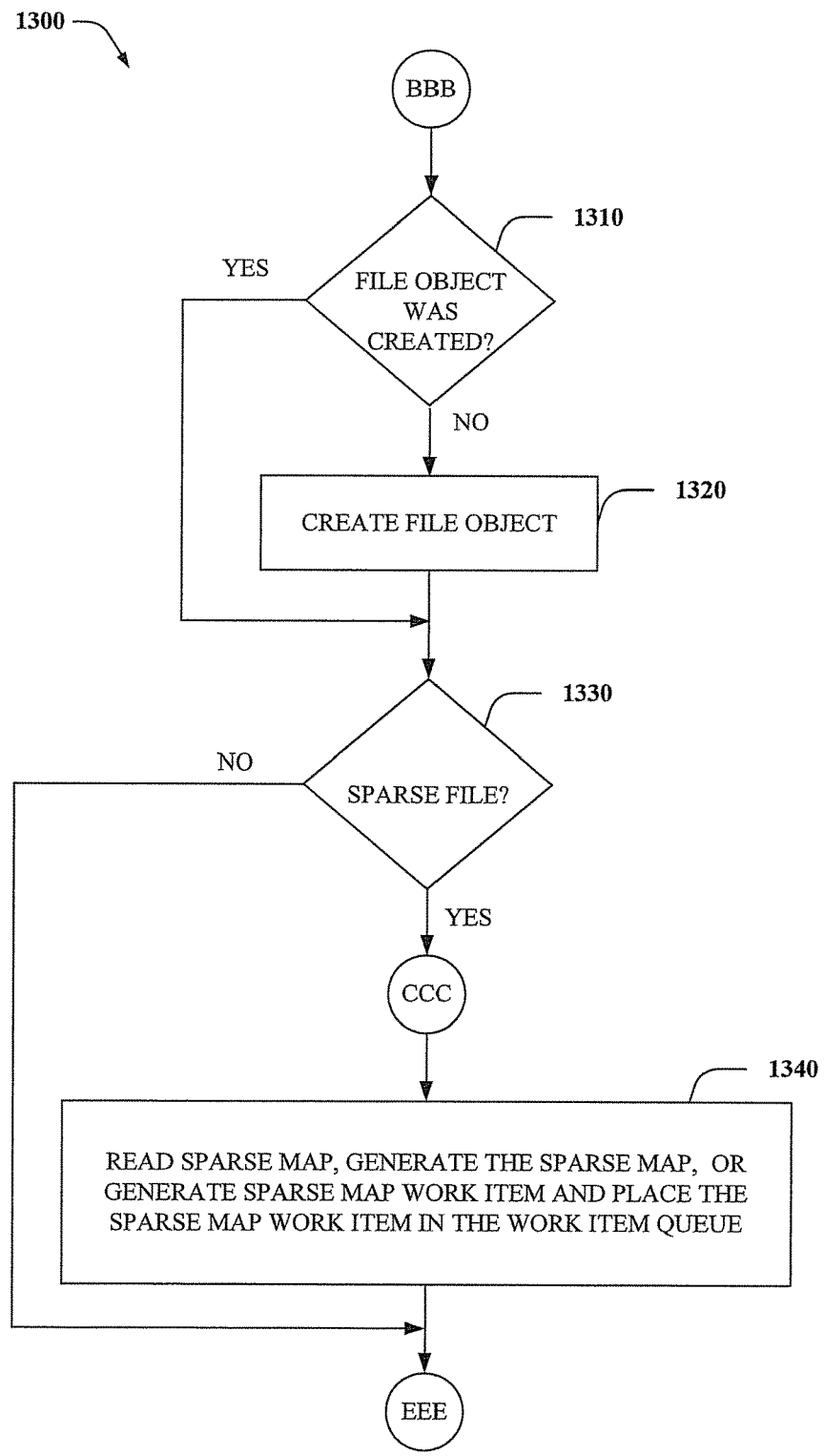
Figure 14:
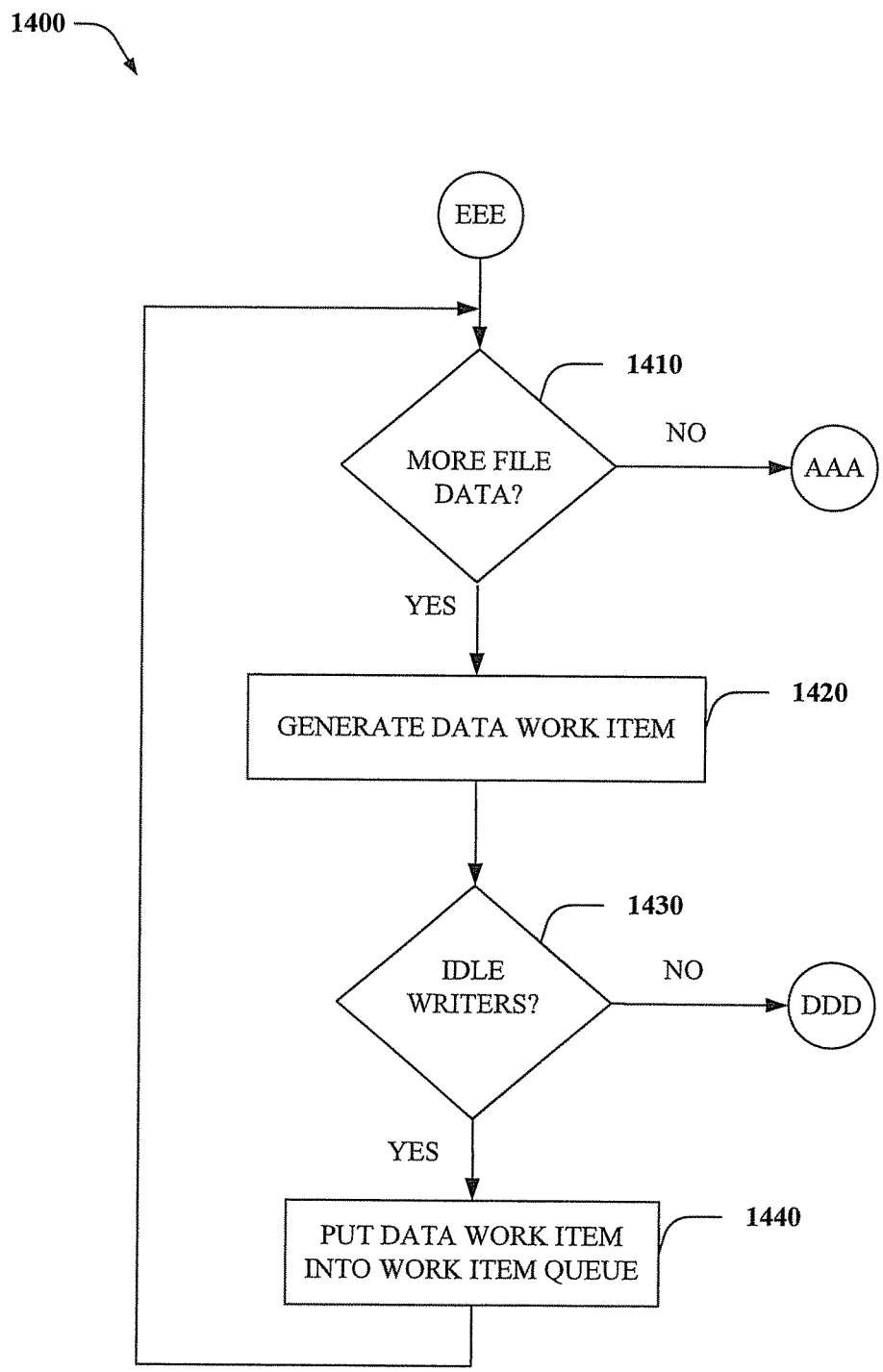
Figure 15:
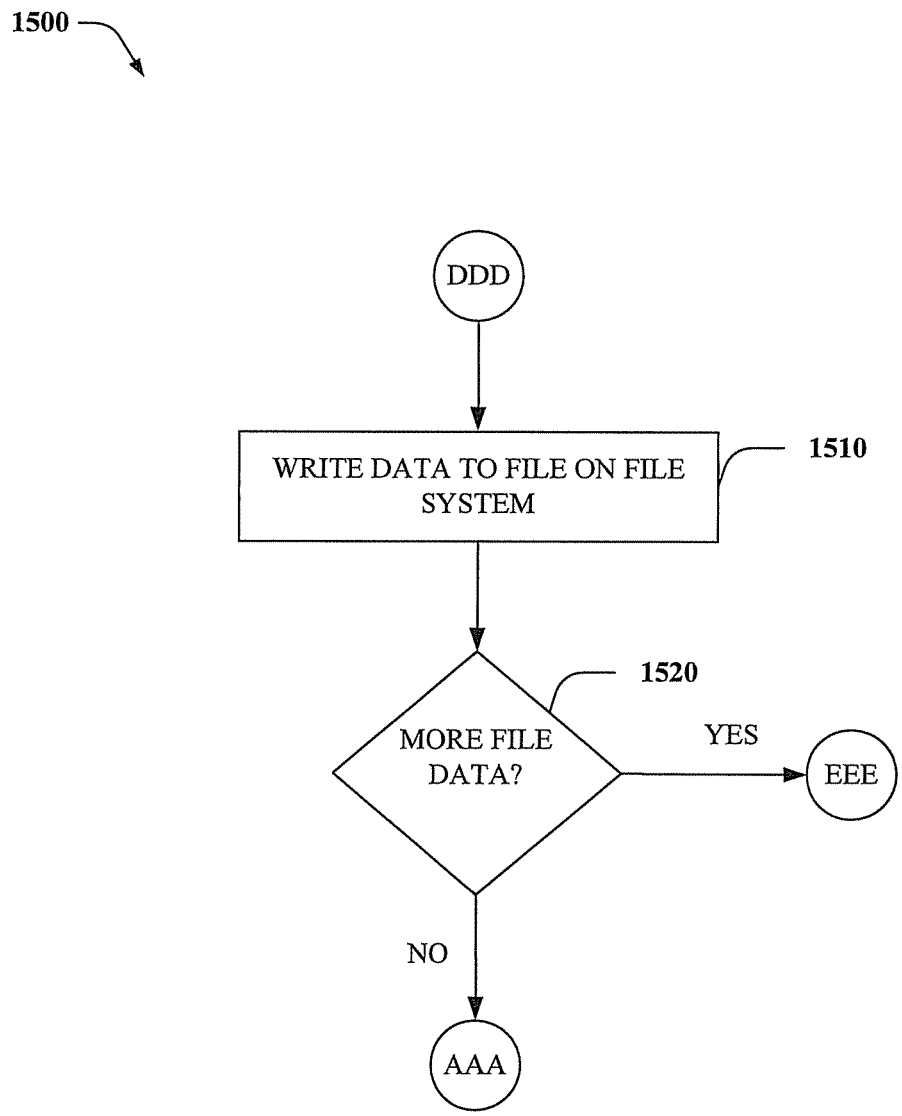

Referring now to FIGS. 5-7, processes 500-700 performed by reader 120, e.g., acting as an NDMP server, are illustrated, in accordance with various embodiments. In this regard, such processes performed by reader 120 can be implemented in a processing thread corresponding to processes 800-1100 (see below) performed by parser component 130, e.g., processes 500-700 can run mutually exclusive from processes 800-1100. For example, as described below, reader 120 executes processes 500-700 after parser component 130 has run out of data in memory, and parser component 130 executes processes 800-1100 after reader 120 copies file data into memory buffers (e.g., 210, 212, 214, 440) as buffered data.

For example, at 510, reader 120 receives a request from parser component 130 to copy data from tape drive 102 into the memory buffers, e.g., each memory buffer of a defined size (e.g., 1 MB), and the memory buffers forming a linked list, e.g., 430, sorted by tape offset of tape drive 102. In this regard, processes 500-700 can be associated with a function called by parser component 130—the function arguments defining a location, or tape offset, of a file to be restored from tape drive 102, and the function arguments defining a size of the file, e.g., number of bytes to be read and copied.

At 520, if it has been determined, based on the size of the file, that more bytes need to be copied, flow continues to 540, at which it can be determined whether buffer space in the memory buffers is available; otherwise flow continues to 530, e.g., to return from the function call via the processing thread. If it is determined, at 540, that the buffer space is available, flow continues to 610, at which it can be determined whether a DMA has performed a seek to a data block of tape drive 102 corresponding to the tape offset; otherwise flow continues to 550, at which process 500 waits for set of writers 140 to free buffer space.

If it is determined, at 610, that the DMA has performed a seek to the data block corresponding to the tape offset, flow continues to 630, at which a memory buffer of the memory buffers can be assigned, allocated, etc. to store data from the tape drive; otherwise, flow continues to 620, at which a request can be sent to the DMA to seek to the data block.

At 710, data, file data, etc. of the data block can be copied, via the DMA, from tape drive 102, e.g., read from tape drive 102 and stored in the memory buffer. At 720, the number of bytes corresponding to the file to be read from tape drive 102 can be adjusted, e.g., in response to determining that the size of the file exceeds the defined size (e.g., 1 MB) of the memory buffer.

At 730, it can be determined whether a work item, e.g., header work item, data work item, etc. is pending. For example, the work item can be pending in response to a "race condition" between the reader and set of writers 140, e.g., in response to set of writers 140 processing a header work item, but data corresponding to the header work item not being included in the memory buffers. In this regard, if it is determined that the work item is pending, flow continues to 740, e.g., to return from the function all via the processing thread; otherwise, flow continues to 520.

Now referring to FIGS. 8-11, processes 800-1100 performed by parser component 130 are illustrated, in accordance with various embodiments. As described below, such processes of parser component 130 have two phases: a "header phase" and a "data phase." In the header phase, parser component 130 parses from, e.g., locates within, etc. the memory buffers the next file header, e.g., pax header format, extended tape archive (tar) format, etc. In this regard, parser component 130 can locate the next file header using a pending, current, existing file header, e.g., based on the size of the pending, current, existing file header and size of data following the pending, current, existing file header.

Further, for each file header, parser component 130 builds, creates, etc. a file object data structure (e.g., 230, 232, 234) and a header work item comprising information for facilitating restoration of a file of the files in file system 150. In embodiment(s), there are four types of work items: header work item, sparse map work item, data work item, and exit work item. A work item can comprise a structure comprising a type, buffer pointer, buffer offset, data size, file offset, point to file object, and links, e.g., to other work items. In this regard, parser component 130 includes, in the header work item, an address pointer for locating the file object data structure within a file list (e.g., 410) of file object data structures. Further, parser component 130 loads, puts, adds, etc. the header work item in work item queue 310, e.g., to be processed, read, etc. by set of writers 140.

In the data phase, parser component 130 directs reader 120 to copy data from tape drive 102 to the memory buffers, e.g., to be processed, read, etc. by set of writers 140, e.g., in response to determining that the memory buffers do not contain data, required data, etc. for parsing and/or processing. In an embodiment, parser component 130 adjusts the number of bytes to be copied by reader 120 based on file size data specified in corresponding file headers and the size of such file headers.

In one embodiment, as described below, upon returning from a request for reader to copy data from tape drive 102 into the memory buffers, parser component can re-queue a pending data work item in response determining that a pending file object exists, e.g., file data is not available in the memory buffers for processing by set of writers 140. In this regard, the processes of parser component 130 run in a loop until all files stored on tape drive 102 have been restored to file system 150.

In another embodiment, parser component 130 can monitor the number of active files, e.g., corresponding to active, open, etc. header work items, and the number of pending, available, etc. bytes in the memory buffers against "high water marks", e.g., against defined memory limits corresponding to parallel restore system 110, e.g., to prevent parallel restore system 110 from running out of memory. In this regard, in response to determining that a high water mark has been reached, parser component 130 can transition to a "sleep", or inactive, state. Further, parser component 130 can transition to an "awake", or active, state in response to receiving, from set of writers 140, an indication that set of writers 140 has finished recovering files to file system 150, or that set of writers 140 has freed memory within the memory buffers.

Referring now to FIGS. 8-11, at 810, it can be determined whether the memory buffers contain data. In this regard, if it is determined that the memory buffers do not contain data, a request is sent to reader 120 to direct reader 120 to copy data from tape drive 102 into the memory buffers; otherwise flow continues to 830, at which it can be determined whether a pending file object (e.g., 450) of file list 410 corresponding to file object data structures (e.g., 230, 232, 234) is associated with a pending data work item.

If it is determined that the pending file object is associated with the pending data work item, e.g., required file data is not available in the memory buffers, flow continues to 840, at which the pending data work item can be re-queued into work item queue 310, e.g., for later processing; otherwise, flow continues to 910, at which a file header can be read from the memory buffers. Flow continues from 840 to 850, at which a number of bytes needed to be parsed by parser component 130 can be adjusted, e.g., decremented.

Flow continues from 910 to 920, at which a file object can be created. At 930, it can be determined whether an end of a data stream of tape drive 102, e.g., end of a tape drive steam, has been reached, e.g., whether the file header contains all zeros. In this regard, if it is determined that the end of the tape drive stream has been reached, flow continues to 1010, at which an exit work item for each writer of set of writers 140 can be generated; otherwise, flow continues to 1110, at which it can be determined, based on the file header, whether an associated file's nlink count is greater than 1, e.g., whether the associated file has hardlinks (e.g., dependencies corresponding to another file), whether the associated file has an alternative data stream (ADS), or whether the file header represents a directory.

If it is determined that the associated file's nlink count is greater than 1, the associated file has an ADS, or the file header represents the directory, flow continues to 1120, at which an object, e.g., directory or file, can be created by parser component 130; otherwise, flow continues to 1130, at which a header work item can be created. In an embodiment, parser component 130 can create an ADS container, data structure, etc. for the object. From 1130, flow continues to 1140, at which the header work item can be loaded, put, etc. in work item queue 310. Flow continues from 1140 to 850, at which the number of bytes needed to be parsed by parser component 130 can be adjusted, e.g., decremented.

Returning to 1010, flow continues from 1010 to 1020, at which the exit work items can be loaded, put, etc. in work item queue 310. From 1020, flow continues to 1025, at which process 1000 can wait for writers of set of writers 140 to complete all, pending, etc. work items. From 1025, flow continues to 1030, at which fixup entries are processed and the restore process is completed. In this regard, when a directory is to be restored, a directory fixup entry is created since files created under the directory in file system 150 will change timestamps of the directory. Thus, timestamps for the restored directory are set after all files and subdirectories under the directory have been created.

In an embodiment, parallel restore system 110 maintains a reference count in the directory fixup entry to record the number of active children corresponding to the directory. Further, parallel restore system 110 associates all file object data structures created under the directory with a pointer to the directory fixup entry. Furthermore, a file object data structure representing the directory comprises a pointer to a parent directory fixup entry, and a pointer to a directory fixup entry for the directory. Parallel restore system 110 can check, review, etc. fixup entries when a new file object data structure has been created. In this regard, parallel restore system 110 can restore timestamps in response to a determination that a fixup entry has no active children, and the new file path is not in the current fixup entry path.

FIGS. 12-15 illustrate processes 800-1100 performed by set of writers 140, in accordance with various embodiments. Set of writers 140 comprises multiple writer processing threads, or writers, that can copy file data of respective files from the memory buffers to file system 150. In this regard, the writers can independently retrieve, load, etc. header work items from work item queue 310, and restore, using respective header work items, files on file system 150.

In other embodiment(s), a writer, or writer processing thread, can generate data work items. In this regard, if a file is small, or other writers, writer processing threads, etc. are busy, not available, etc., the writer can process the data work item as described below to facilitate restoration of a respective file on file system 150. On the other hand, if the file is large, or other writers have been determined to be idle, e.g., free to process data work items, the writer can load the data work item into work item queue 310, e.g., to be processed by one of the other writers.

In other embodiment(s), if the writer determines that a data work item cannot be completed, processed, etc. because corresponding data has not been copied into the memory buffers, the writer can designate an associated file object data structure as a pending file object (e.g., 450). In this regard, as described above, parser component can re-queue the pending data work item into work item queue 310, e.g., for later processing, e.g., in response to a determination by parser component 130 that the memory buffers contain data, e.g., corresponding to the pending data work item.

Now referring to FIGS. 12-15, at 1210, a writer of set of writers 140 can retrieve a work item from work item queue 310. At 1220, in response to the work item being identified as a header work item, flow continues to 1310, at which it can be determined whether a file object, file object data structure, etc. corresponding to the work item was created. In this regard, if it is determined that the file object, file object data structure, etc. was created, flow continues to 1330; otherwise, the file object, file object data structure, etc. can be created at 1320. In an embodiment, the writer can place the file object in a file object list, e.g., file list 410.

At 1330, it can be determined whether the file object is a sparse file, e.g., comprising a sparse map and a condensed data stream. In this regard, in response to determining that the file object is a sparse file, flow continues to 1340, at which the writer can read the sparse map if it has been created. Further, if it has not been created, the writer can create the sparse map, or generate a sparse map work item and place it in work item queue 310.

Flow continues form 1340 to 1410, at which it can be determined whether more file data has to be processed. In this regard, a remaining byte count can be maintained in the file object, e.g., to determine how many data bytes remain to be processed. Further, as described above, the file object can be freed, released, etc. when all associated file data has been recovered to file system 150. If it is determined that more file data has to be processed, the writer can generate, create, etc. a data work item at 1420; otherwise, flow returns to 1210.

Flow continues from 1420 to 1430, at which it can be determined whether any writers of set of writers 140 is idle, e.g., free to process work items. If it is determined that a writer of set of writers 140 is idle, flow continues to 1440, at which the data work item is placed, put, etc. into work item queue 310, e.g., to be processed by such idle writer; otherwise, flow returns to 1510, at which the writer can write, restore, etc. the data to the file on file system 150. Flow continues from 1510 to 1520, at which it can be determined whether more file data has to be processed (see e.g. 1410). If it is determined that more file data has to be processed, flow returns to 1410; otherwise flow returns to 1210.

Returning now to FIG. 12, at 1220, in response to the work item being identified as a sparse map work item, flow continues to 1340, at which the writer can generate the sparse map. In response to the work item being identified, at 1220, as a data work item, flow continues to 1510, at which the writer can write, restore, etc. the data to the file on file system 150. In response to the work item being identified, at 1220, as an exit work item, flow ends at 1230, e.g., the writer, writer thread, etc. terminates.

In one embodiment, the writer can free a work item by: adjusting a corresponding file object's tape processed offset; removing the work item from the file object's work item list and decrementing the work item counter; freeing memory allocated for the work item; and confirming that the file object can be freed. In another embodiment, the writer can free a file object by: verifying whether buffers should be freed if the file object is the first file object in file list 410; freeing memory allocated for the file object if the file object has no pending work item and all file data has been recovered, restored, etc.; and restoring attributes of the file before the file object is freed.

Figure 16:
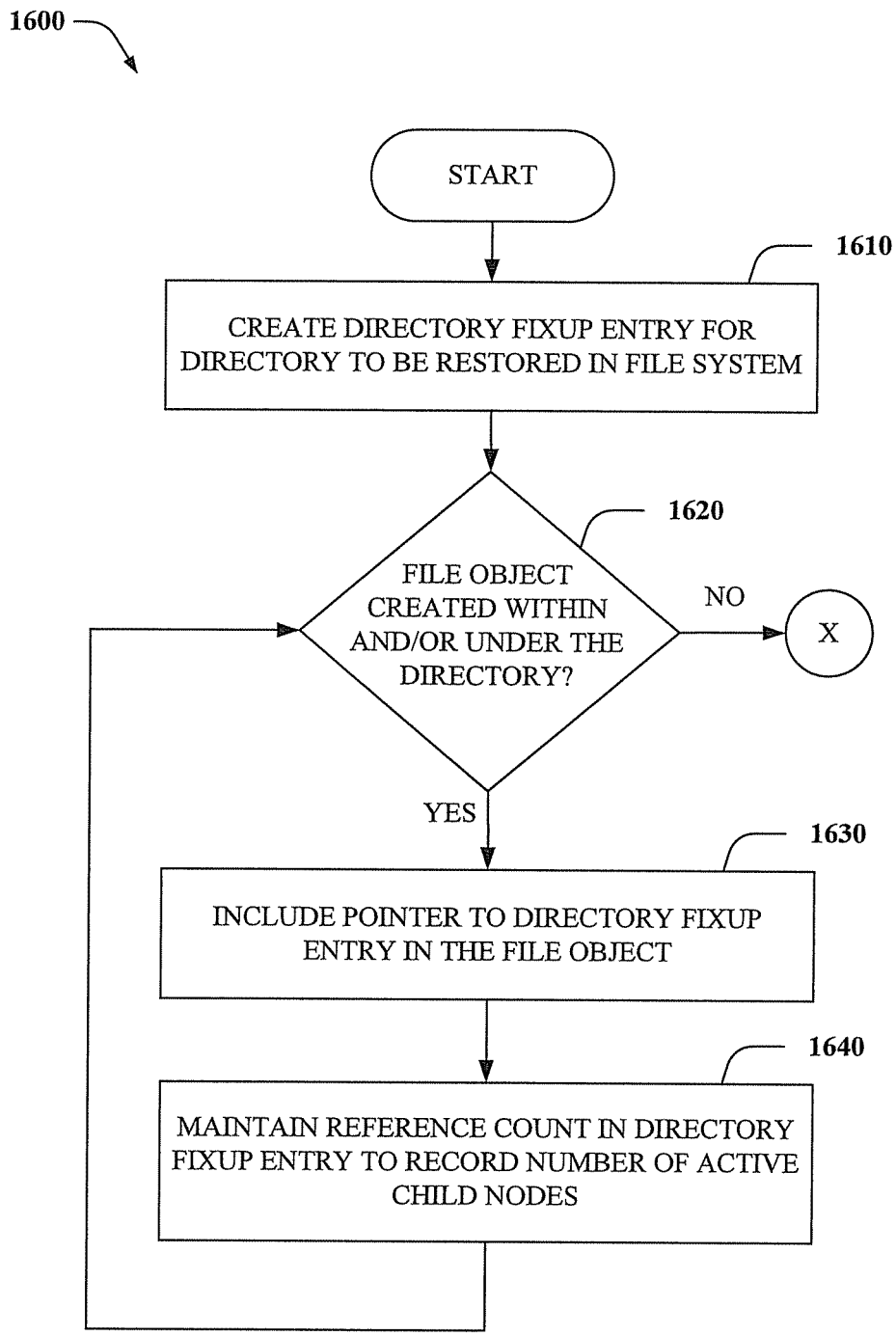
FIGS. 16 and 17 illustrate flow charts of methods associated with restoring timestamps during the NDMP restore, in accordance with various embodiments.
Figure 17:
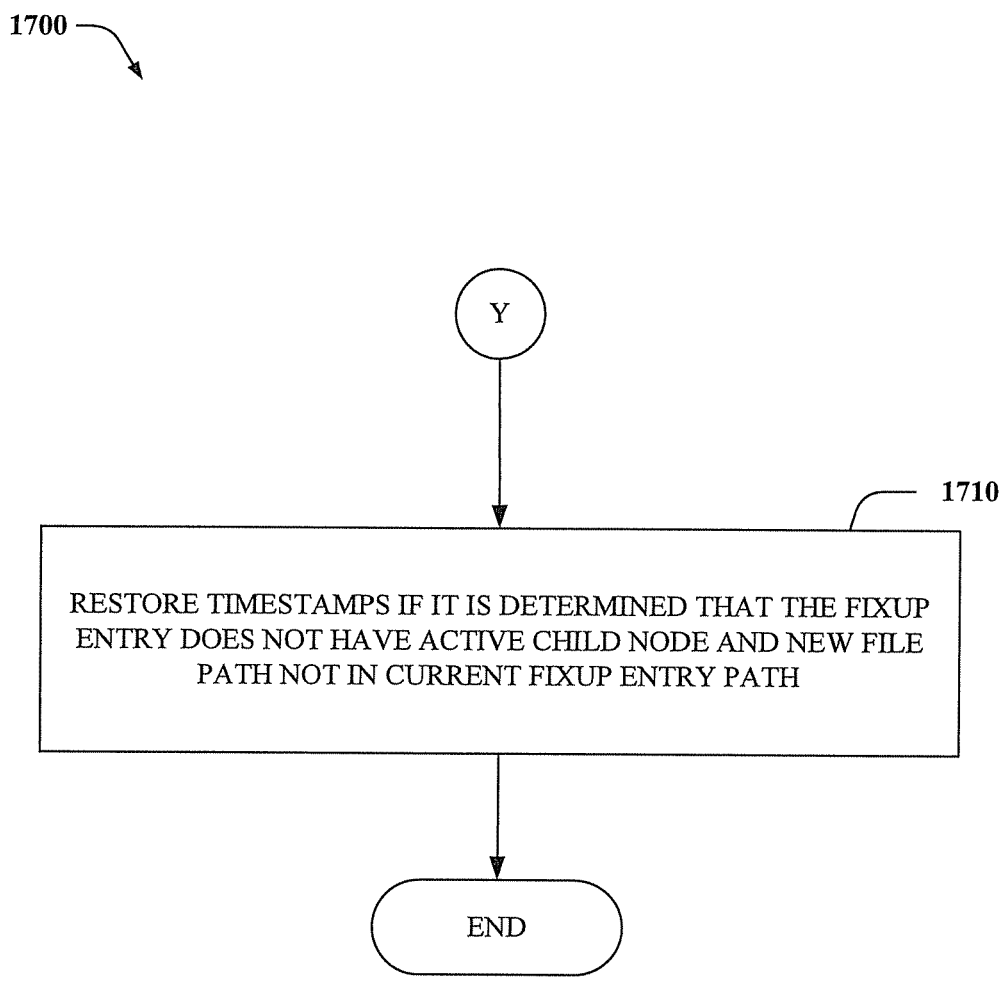
Figure 18:
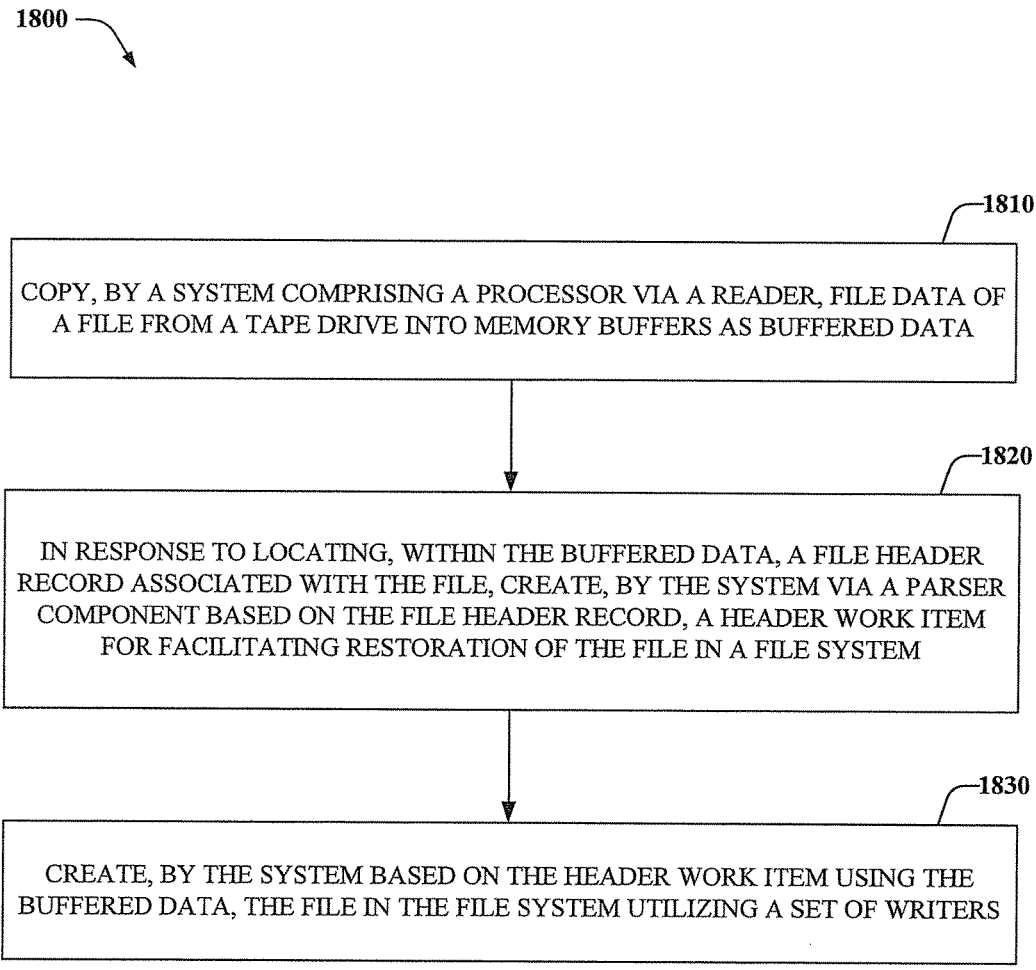
FIGS. 18-22 illustrate flowcharts of methods associated with an NDMP restore, in accordance with various embodiments.
Figure 19:
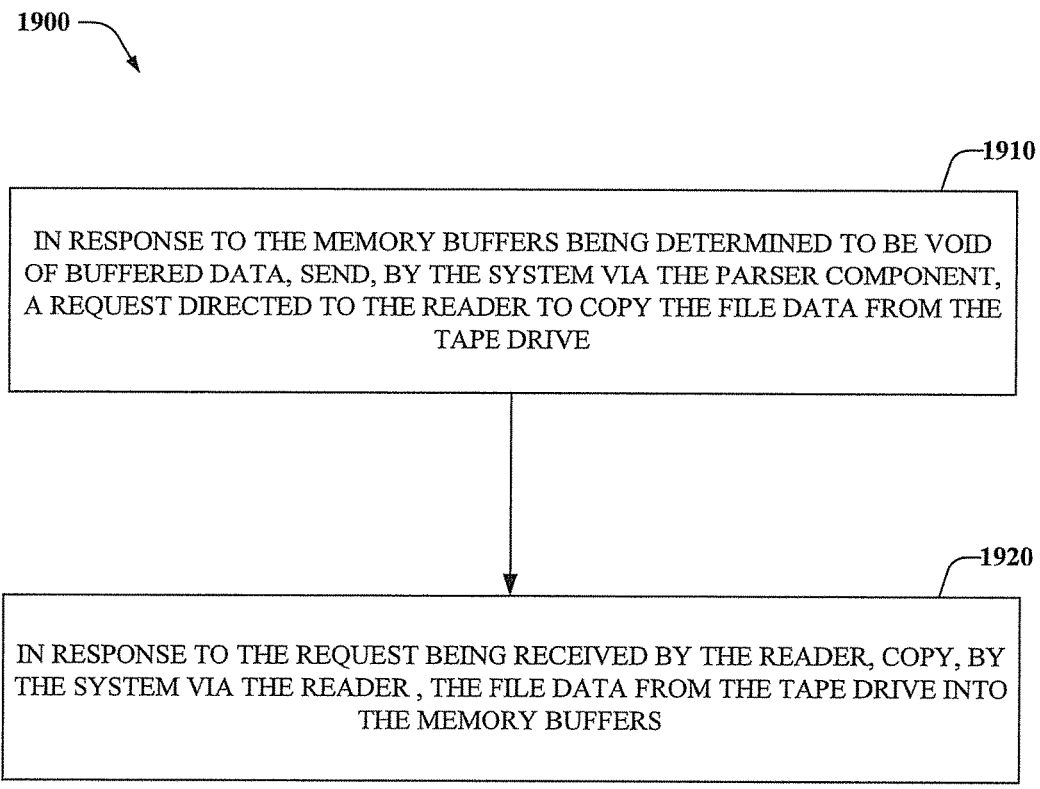
Figure 20:
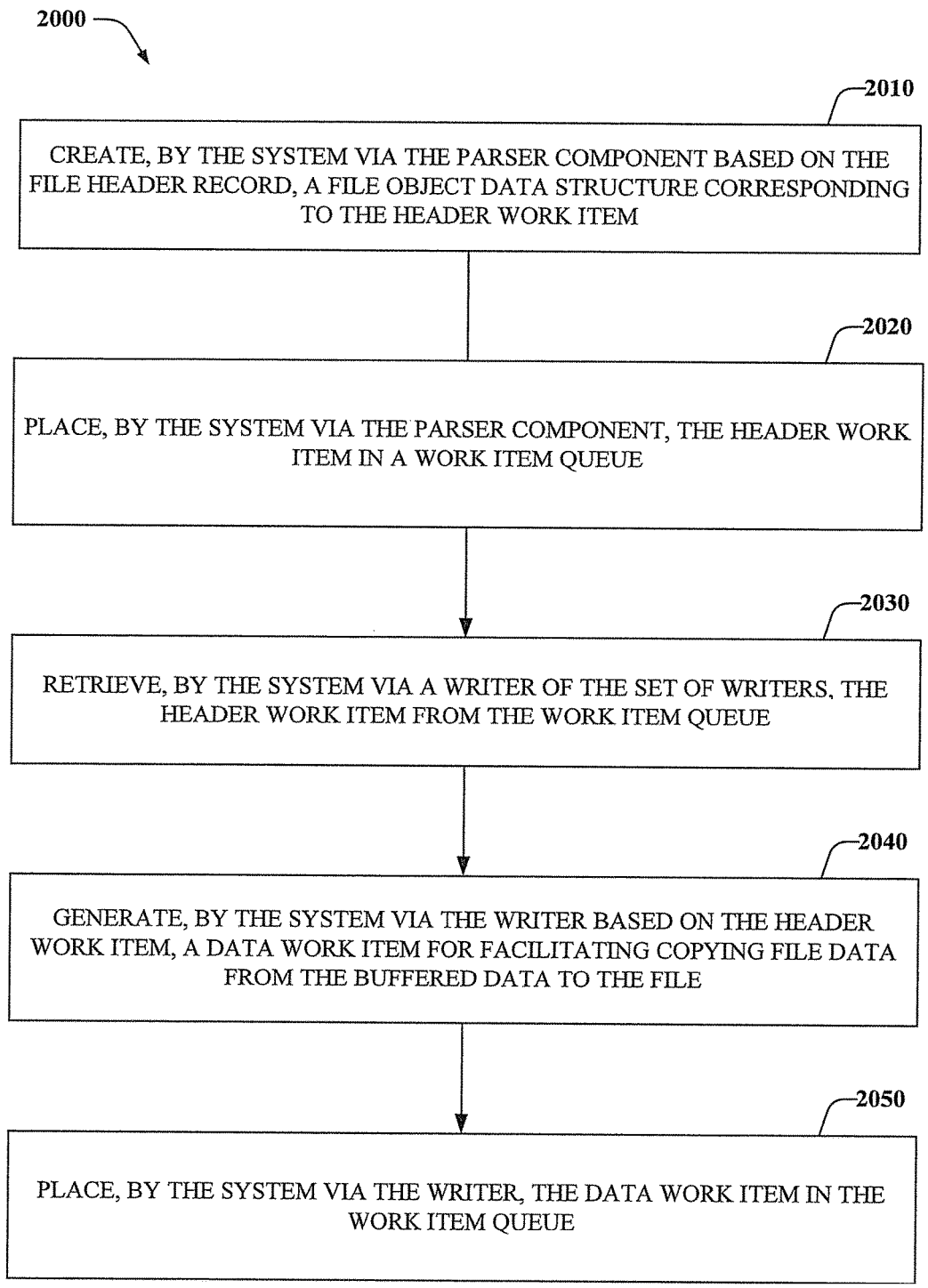
Figure 21:
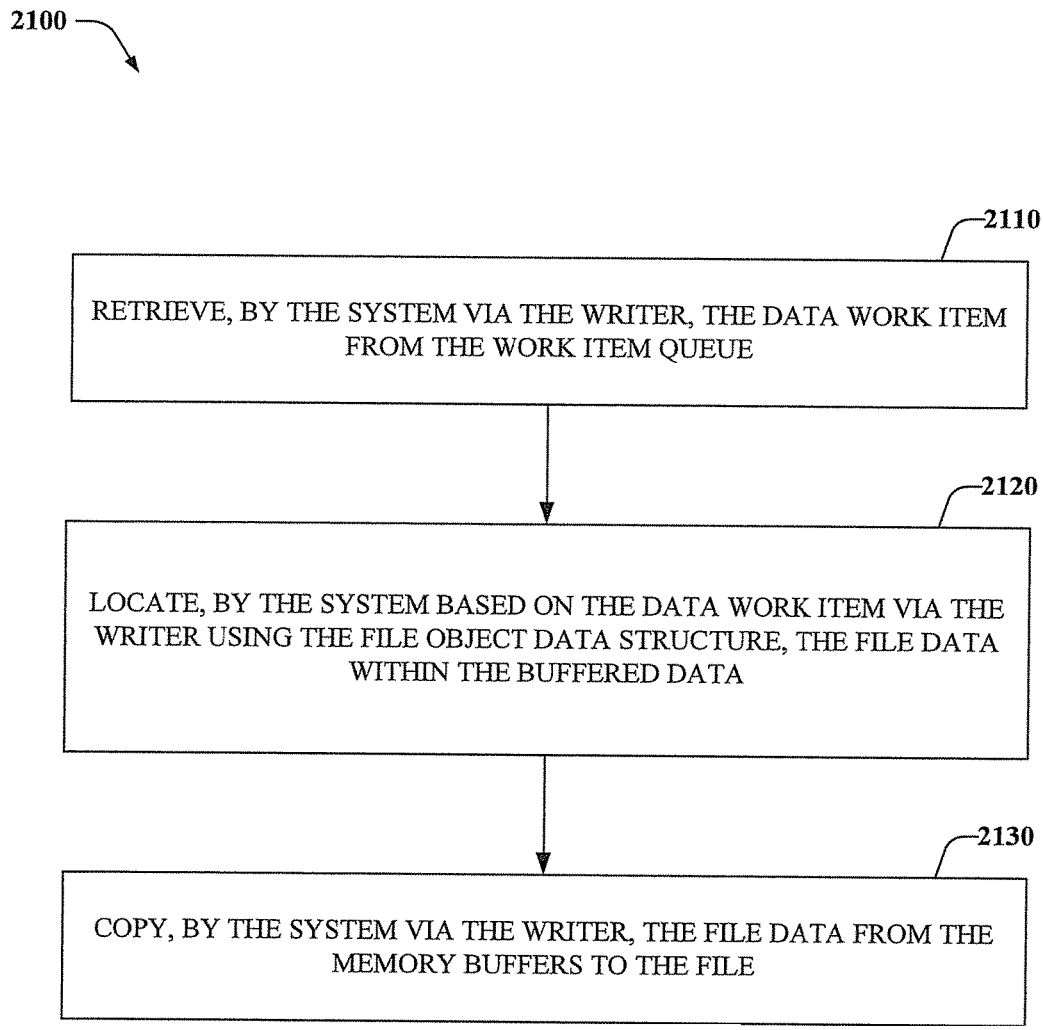
Figure 22:
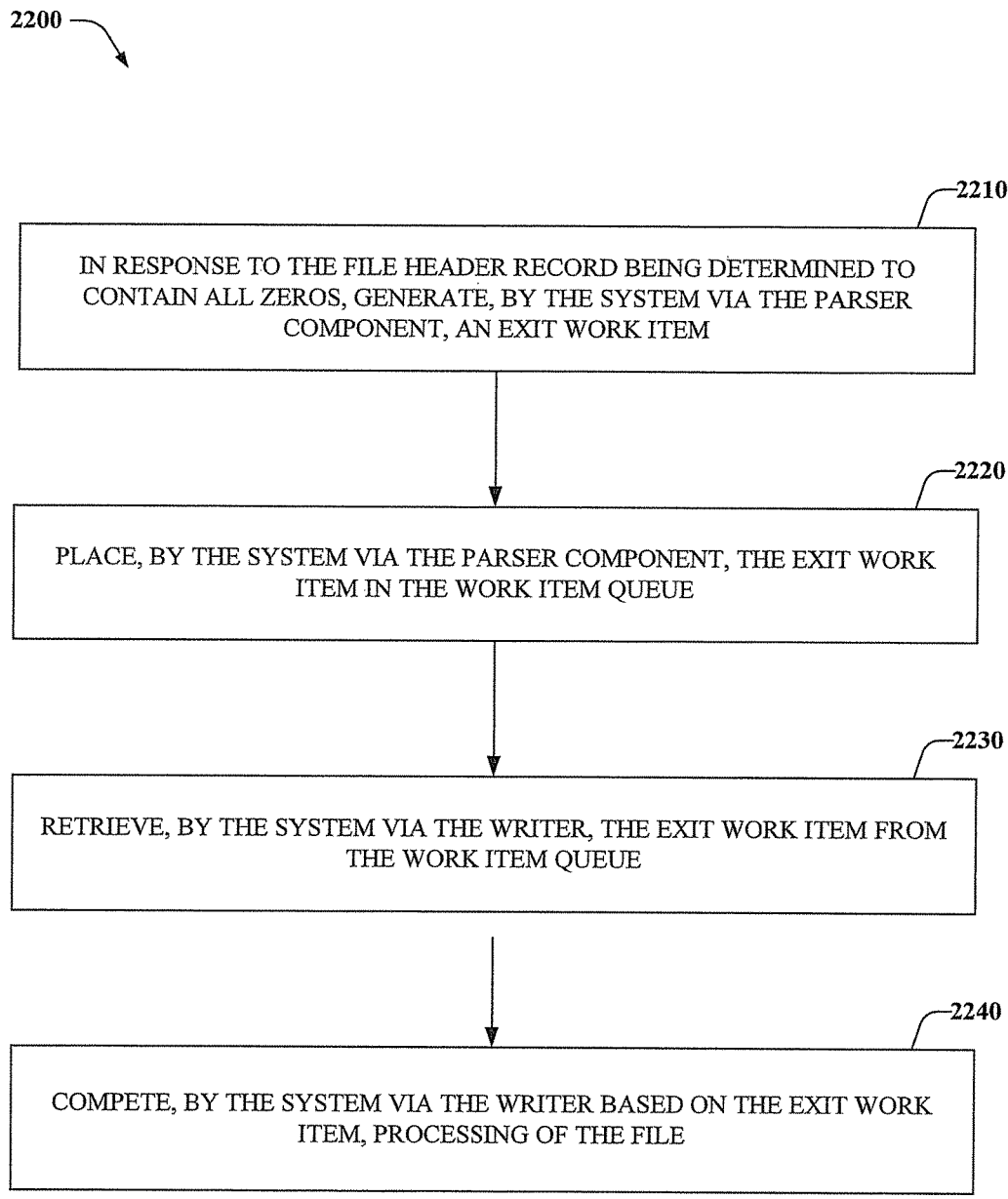

Referring now to FIGS. 16 and 17, processes 1600 and 1700 associated with restoring timestamps during the NDMP restore are illustrated, in accordance with various embodiments. At 1610, directory fixup entry for a directory to be restored on file system 150 can be created. As described above, the directory fixup entry is created since files created in file system 150 under the directory will change timestamps of the directory. At 1620, it can be determined whether a file object, file object data structure, etc. has been created within and/or under the directory. If it is determined that the file object has been created within and/or under the directory, flow continues to 1630, at which a pointer to the directory fixup entry can be included in the file object; otherwise, flow continues to 1710, at which timestamps can be restored in response to a determination that the directory fixup entry has no active children, and a new file path is not in a current fixup entry path. From 1630, flow continues to 1640, at which a reference count can be maintained in the directory fixup entry to record the number of active children, nodes, etc. corresponding to the directory. Further, from 1640, flow continues to 1620.

FIGS. 18-22 illustrate processes 1800-2200 of methods associated with an NDMP restore, in accordance with various embodiments. At 1810, file data of a file can be copied, by a system comprising a processor via reader 120, from tape drive 102 into memory buffers as buffered data. At 1820, a header work item for facilitating restoration of the file in file system 150 can be created, by the system via parser component 130, based on a file header record associated with the file that has been located within the buffered data. At 1830, the file can be restored, created, etc., by the system, in file system 150, based on the header work item using the buffered data utilizing set of writers 140.

At 1910, a request to copy the file data from tape drive 102 to the memory buffers can be sent, directed to, etc., by the system via parser component 130, to reader 120 in response to the memory buffers being determined to be void of buffered data. At 1920, the file data can be copied, by the system via reader 120, from tape drive 102 into the memory buffers in response to the request being received by reader 120.

At 2010, a file object data structure corresponding to a header work item can be created, by the system via parser component 130, based on the file header record. At 2020, the header work item can be placed, by the system via parser component 130, the header work item in work item queue 310. At 2030, the header work item can be retrieved, from the work item queue, by the system via a writer of set of writers 130. At 2040, a data work item for facilitating copying file data from the buffered data to the file on file system 150 can be generated by the system via the writer based on the header work item. At 2050, the data work item can be placed, by the system via the writer, in work item queue 310.

At 2110, the data work item can be retrieved, from work item queue 310, by the system via the writer. At 2120, the file data can be located, within the buffered data, by the system based on the data work item via the writer using the file object data structure. At 2130, the file data can be copied, by the system via the writer, from the memory buffers to the file.

At 2210, an exit work item can be generated, by the system via parser component 130, in response to the file header record being determined to contain all zeros. At 2220, the exit work item can be placed, by the system via parser component 130, in work item queue 310. At 2230, the exit work item can be retrieved, by the system via the writer, from work item queue 310. At 2240, processing of the file can be completed, by the system via the writer, based on the exit work item.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantumdot based transistors, switches and gates, in order to optimize space usage or enhance performance of mobile devices. A processor may also be implemented as a combination of computing processing units.

In the subject specification, terms such as "store," "data store," "data storage," "database," "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in non-volatile memory 2322 (see below), disk storage 2324 (see below), and/or memory storage 2346 (see below). Further, nonvolatile memory can be included in read only memory (ROM), programmable ROM (PROM), electrically programmable ROM (EPROM), electrically erasable ROM (EEPROM), or flash memory. Volatile memory 2320 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 23:
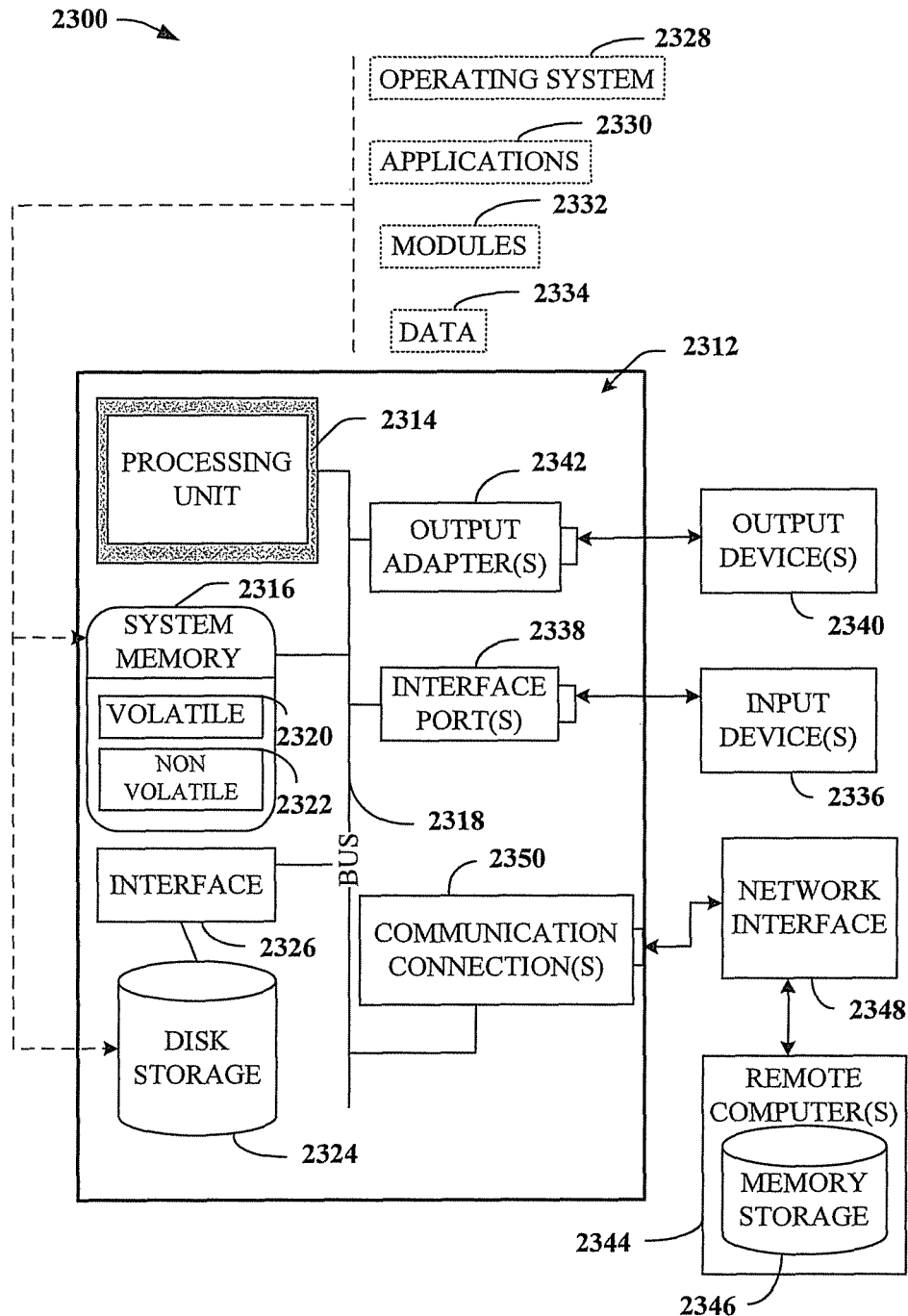
FIG. 23 is a block diagram representing an illustrative non-limiting computing system or operating environment in which one or more aspects of various embodiments described herein can be implemented.

In order to provide a context for the various aspects of the disclosed subject matter, FIG. 23, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 23, a block diagram of a computing system 2300 operable to execute the disclosed systems and methods is illustrated, in accordance with an embodiment. Computer 2312 comprises a processing unit 2314, a system memory 2316, and a system bus 2318. System bus 2318 couples system components comprising, but not limited to, system memory 2316 to processing unit 2314. Processing unit 2314 can be any of various available processors. Dual microprocessors and other multiprocessor architectures also can be employed as processing unit 2314.

System bus 2318 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 2316 comprises volatile memory 2320 and nonvolatile memory 2322. A basic input/output system (BIOS), containing routines to transfer information between elements within computer 2312, such as during start-up, can be stored in nonvolatile memory 2322. By way of illustration, and not limitation, nonvolatile memory 2322 can comprise ROM, PROM, EPROM, EEPROM, or flash memory. Volatile memory 2320 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2312 also comprises removable/non-removable, volatile/non-volatile computer storage media. FIG. 23 illustrates, for example, disk storage 2324. Disk storage 2324 comprises, but is not limited to, devices like a magnetic disk drive, floppy disk drive, tape drive, Jaz drive, Zip drive, LS-100 drive, flash memory card, or memory stick. In addition, disk storage 2324 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2324 to system bus 2318, a removable or non-removable interface is typically used, such as interface 2326.

It is to be appreciated that FIG. 23 describes software that acts as an intermediary between users and computer resources described in suitable operating environment 2300. Such software comprises an operating system 2328. Operating system 2328, which can be stored on disk storage 2324, acts to control and allocate resources of computer system 2312. System applications 2330 take advantage of the management of resources by operating system 2328 through program modules 2332 and program data 2334 stored either in system memory 2316 or on disk storage 2324. It is to be appreciated that the disclosed subject matter can be implemented with various operating systems or combinations of operating systems.

A user can enter commands, e.g., via UI component 510, or information into computer 2312 through input device(s) 2336. Input devices 2336 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 2314 through system bus 2318 via interface port(s) 2338. Interface port(s) 2338 comprise, for example, a serial port, a parallel port, a game port, a universal serial bus (USB), a wireless based port, e.g., Wi-Fi, Bluetooth, etc. Output device(s) 2340 use some of the same type of ports as input device(s) 2336.

Thus, for example, a USB port can be used to provide input to computer 2312 and to output information from computer 2312 to an output device 2340. Output adapter 2342 is provided to illustrate that there are some output devices 2340, like display devices, light projection devices, monitors, speakers, and printers, among other output devices 2340, which use special adapters. Output adapters 2342 comprise, by way of illustration and not limitation, video and sound devices, cards, etc. that provide means of connection between output device 2340 and system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. Remote computer(s) 2344 can be a personal computer, a server, a router, a network PC, a workstation, a microprocessor based appliance, a peer device, or other common network node and the like, and typically comprises many or all of the elements described relative to computer 2312.

For purposes of brevity, only a memory storage device 2346 is illustrated with remote computer(s) 2344. Remote computer(s) 2344 is logically connected to computer 2312 through a network interface 2348 and then physically and/or wirelessly connected via communication connection 2350. Network interface 2348 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 2350 refer(s) to hardware/software employed to connect network interface 2348 to bus 2318. While communication connection 2350 is shown for illustrative clarity inside computer 2312, it can also be external to computer 2312. The hardware/software for connection to network interface 2348 can comprise, for example, internal and external technologies such as modems, comprising regular telephone grade modems, cable modems and DSL modems, wireless modems, ISDN adapters, and Ethernet cards.

The computer 2312 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 2312 can connect to other devices/networks by way of antenna, port, network interface adaptor, wireless access point, modem, and/or the like.

The computer 2312 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
copying, by a reader of the system, data representing respective files that have been stored in a tape drive from the tape drive to memory buffers as buffered data;
determining file header records representing locations of the respective files in the memory buffers;
based on the file header records, generating and storing respective work items in a work item queue for facilitating restoration of the respective files; and
independently recovering, utilizing multiple writers of a group of writers of the system, multiple files of the respective files to the system, wherein the independently recovering comprises storing a header work item of the respective work items in the work item queue, retrieving the header work item from the work item queue, and creating, based on a file header record of the file header records, a file object data structure comprising information for facilitating restoration of a file of the respective files, wherein the header work item comprises an address pointer for locating the file object data structure within a file list, and wherein the multiple writers independently retrieve, in order of tape offsets of the multiple files within the tape drive, the respective work items from the work item queue to facilitate parallel recovery, by the multiple writers, of the multiple files from the memory buffers according to the order of the tape offsets of the multiple files within the tape drive.

2. The system of claim 1, wherein the operations further comprise:
sending a request directed to the reader to copy the data from the tape drive.

3. The system of claim 2, wherein the sending comprises:
sending the request directed to the reader in response to a determination that the file header record has not been included in the buffered data.

4. The system of claim 2, wherein the copying comprises:
based on the request, copying, by the reader, the data from the tape drive to the memory buffers.

5. The system of claim 1, wherein the operations further comprise:
generating a data work item of the respective work items for facilitating copying file data from the buffered data to the file; and
placing the data work item in the work item queue.

6. The system of claim 5, wherein the operations further comprise:
retrieving the data work item from the work item queue;
based on the data work item using the file object data structure, locating the file data within the buffered data; and
copying the file data from the memory buffers to the file.

7. The system of claim 1, wherein the operations further comprise:
in response to the file header record being determined to contain all zeros, generating an exit work item of the respective work items; and
placing the exit work item in the work item queue.

8. The system of claim 7, wherein operations further comprise:
retrieving the exit work item from the work item queue; and
based on the exit work item, completing a selected restoration of the file.

9. The system of claim 1, wherein the memory buffers comprise a linked list that has been sorted based on the tape offsets.

10. A method, comprising:
copying, by a computer system comprising a processor, data representing respective files that have been stored in a tape drive from the tape drive to memory buffers as buffered data;
determining, by the computer system, file header records representing locations of the respective files in the memory buffers;
based on the file header records, generating and storing, by the computer system, respective work items in a work item queue for facilitating restoration of the respective files; and
independently recovering, utilizing multiple writers of a group of writers of the computer system, multiple files of the respective files to the computer system, wherein the independently recovering comprises
storing a header work item of the respective work items in the work item queue, retrieving the header work item from the work item queue, and
creating, based on a file header record of the file header records, a file object data structure comprising information for facilitating restoration of a file of the respective files, wherein the header work item of the respective work items comprises an address pointer for locating the file object data structure within a file list, and wherein the multiple writers independently retrieve, in order of tape offsets of the multiple files within the tape drive, the respective work items from the work item queue to facilitate parallel recovery, by the multiple writers, of the multiple files from the memory buffers according to the order of the tape offsets of the multiple files within the tape drive.

11. The method of claim 10, further comprising:
creating, by the computer system, a data work item for facilitating copying file data from the buffered data to the file; and
placing, by the computer system, the data work item in the work item queue.

12. The method of claim 11, further comprising:
retrieving, by the computer system, the data work item from the work item queue;
locating, by the computer system based on the data work item using the file object data structure, the file data within the buffered data; and
copying, by the computer system, the file data from the memory buffers to the file in the file system.

13. A non-transitory computer-readable storage device having stored thereon executable instructions that, in response to execution, cause a device comprising a processor to perform operations, the operations comprising:
copying data representing respective files that have been stored in a tape drive from the tape drive to memory buffers as buffered data;
determining file header records representing locations of the respective files in the memory buffers;
based on the file header records, generating and storing respective work items in a work item queue for facilitating restoration of the respective files; and
independently recovering, utilizing multiple writers of a group of writers of the device, multiple files of the respective files to the device, wherein the independently recovering comprises
storing a header work item of the respective work items in the work item queue,
retrieving the header work item from the work item queue, and
creating, based on a file header record of the file header records, a file object data structure comprising information for facilitating restoration of a file of the respective files, wherein the header work item of the respective work items comprises an address pointer for locating the file object data structure within a file list, and wherein the multiple writers independently retrieve, in order of tape offsets of the multiple files within the tape drive, the respective work items from the work item queue to facilitate parallel recovery, by the multiple writers, of the multiple files from the memory buffers according to the order of the tape offsets of the multiple files within the tape drive.

14. The non-transitory computer-readable storage device of claim 13, wherein the operations further comprise:
creating a data work item for facilitating copying file data from the buffered data to the file; and
placing the data work item in the work item queue.

15. The non-transitory computer-readable storage device of claim 14, wherein the operations further comprise:
retrieving the data work item from the work item queue;
locating, based on the data work item, the file data within the buffered data; and
copying the file data from the buffered data to the file in the file system.

* * * * *